United States Patent
Liao et al.

(10) Patent No.: US 12,541,230 B2
(45) Date of Patent: Feb. 3, 2026

(54) FOLDING APPARATUS AND ELECTRONIC DEVICE

(71) Applicant: HUAWEI TECHNOLOGIES CO., LTD., Guangdong (CN)

(72) Inventors: Changliang Liao, Dongguan (CN); Ding Zhong, Dongguan (CN); Hewen Shen, Dongguan (CN); Tengfei Zhou, Dongguan (CN); Weigui Chen, Shenzhen (CN); Wenwen Wu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 296 days.

(21) Appl. No.: 18/555,719

(22) PCT Filed: Mar. 29, 2022

(86) PCT No.: PCT/CN2022/083809
§ 371 (c)(1),
(2) Date: Oct. 16, 2023

(87) PCT Pub. No.: WO2022/218147
PCT Pub. Date: Oct. 20, 2022

(65) Prior Publication Data
US 2024/0206093 A1   Jun. 20, 2024

(30) Foreign Application Priority Data
Apr. 16, 2021 (CN) .......................... 202110413077.1

(51) Int. Cl.
G06F 1/16 (2006.01)
H04M 1/02 (2006.01)
F16C 11/04 (2006.01)

(52) U.S. Cl.
CPC .......... *G06F 1/1681* (2013.01); *G06F 1/1652* (2013.01); *H04M 1/022* (2013.01);
(Continued)

(58) Field of Classification Search
CPC .... G06F 1/1681; G06F 1/1652; G06F 1/1641; G06F 1/1616; H04M 1/022; H04M 1/0268
See application file for complete search history.

(56) References Cited

U.S. PATENT DOCUMENTS 9,348,450 B1 * 5/2016 Kim .................... H04M 1/0268
9,677,308 B1 * 6/2017 Chen ........................ E05D 3/18
(Continued)

FOREIGN PATENT DOCUMENTS

| JP | 2021033192 A | 3/2021 |
| WO | 2020156138 A1 | 8/2020 |
| WO | 2020186889 A1 | 9/2020 |

*Primary Examiner* — Nidhi Thaker

(57) ABSTRACT

A folding apparatus includes a principal axis, a first bracket and a second bracket that are located on two sides of a principal axis along a width direction. A first connecting rod and a second connecting rod are located on two sides of the principal axis along the width direction, and a first swing arm and a second swing arm are located on two sides of the principal axis along the width direction. A first support plate and a second support plate are located on two sides of the principal axis along the width direction. When the first bracket and the second bracket rotate to be positioned face-to-face, and a length of accommodating space of the folding apparatus that accommodates a folded part of a flexible display can be extended.

29 Claims, 23 Drawing Sheets

(52) U.S. Cl.
    CPC .......... *H04M 1/0268* (2013.01); *F16C 11/04* (2013.01); *G06F 1/1616* (2013.01); *G06F 1/1641* (2013.01)

(56) References Cited

U.S. PATENT DOCUMENTS

| | | | | |
|---|---|---|---|---|
| 10,469,635 | B1* | 11/2019 | Carlson | G06F 1/1683 |
| 10,545,541 | B1* | 1/2020 | Dighde | E05D 3/122 |
| 10,754,377 | B2* | 8/2020 | Siddiqui | G06F 1/1652 |
| 11,294,431 | B2* | 4/2022 | Torres | G06F 1/1681 |
| 11,703,916 | B2* | 7/2023 | Tian | G06F 1/1616 |
| | | | | 361/679.27 |
| 11,706,886 | B2* | 7/2023 | Wu | H05K 5/0217 |
| | | | | 361/807 |
| 11,726,530 | B2* | 8/2023 | Kang | H04B 1/3833 |
| | | | | 361/679.27 |
| 11,762,431 | B2* | 9/2023 | Zhan | G06F 1/1681 |
| | | | | 361/679.27 |
| 11,846,998 | B2* | 12/2023 | Wu | H05K 5/0226 |
| 12,010,254 | B2* | 6/2024 | Liu | H04M 1/022 |
| 12,047,521 | B2* | 7/2024 | Liao | G06F 1/1652 |
| 12,301,741 | B2* | 5/2025 | Zhang | G06F 1/1681 |
| 12,316,791 | B2* | 5/2025 | Liao | G06F 1/1681 |
| 12,332,695 | B2* | 6/2025 | Lin | G06F 1/181 |
| 2016/0302314 | A1* | 10/2016 | Bae | G06F 1/16 |
| 2020/0097051 | A1* | 3/2020 | Liu | G06F 1/1652 |
| 2020/0348732 | A1* | 11/2020 | Kang | E05D 3/122 |
| 2021/0181808 | A1* | 6/2021 | Liao | H04M 1/0216 |
| 2021/0271294 | A1* | 9/2021 | Liao | G06F 1/181 |
| 2021/0368032 | A1 | 11/2021 | Liao et al. | |
| 2022/0377919 | A1* | 11/2022 | Zhang | H04M 1/022 |

\* cited by examiner

FOLDING APPARATUS AND ELECTRONIC DEVICE

CROSS-REFERENCE TO RELATED APPLICATIONS

This application is a national stage of International Application No. PCT/CN2022/083809 filed on Mar. 29, 2022, which claims priority to Chinese Patent Application No. 202110413077.1 filed on Apr. 16, 2021. Both of the aforementioned applications are hereby incorporated by reference in their entireties.

TECHNICAL FIELD

This application relates to the field of electronic device technologies, and in particular, to a folding apparatus and an electronic device.

BACKGROUND

A folding electronic device includes a housing, a folding apparatus, and a flexible display. The housing includes a left housing and a right housing that are disposed separately, a folding assembly is located between the left housing and the right housing, and the flexible display is mounted on the left housing and the right housing. When the left housing and the right housing are folded under driving of the folding assembly, the flexible display can be driven to fold, so that the electronic device is in a folded state. In the folded state, a volume of the electronic device is small, so that the electronic device is easy to store. When the left housing and the right housing are expanded under the driving of the folding assembly, the flexible display is driven to expand, so that the electronic device is in an expanded state. In the expanded state, a display of the electronic device is large, and user experience can be improved.

Currently, in a folding process of an existing folding electronic device, a length of a folding apparatus does not change. In the folding process of the folding electronic device, the folding apparatus cannot provide sufficient screen accommodating space for a flexible display, and the flexible display is pulled or squeezed at a folding position, leading to adverse phenomena such as a crease and even damage to the flexible display.

SUMMARY

This application provides a folding apparatus and an electronic device, to reduce pulling or squeezing caused to a flexible display in a folding process.

A first aspect of this application provides a folding apparatus, where the folding apparatus includes:
a principal axis;
a bracket assembly, where the bracket assembly includes a first bracket and a second bracket that are arranged on two sides of the principal axis along a width direction of the principal axis;
a connecting rod assembly, where the connecting rod assembly includes a first connecting rod and a second connecting rod that are arranged on two sides of the principal axis along the width direction of the principal axis, the first connecting rod and the second connecting rod can rotate relative to the principal axis, the first connecting rod has a first outer end part away from the principal axis, the second connecting rod has a second outer end part away from the principal axis, the first bracket can slide relative to the first connecting rod, and the second bracket can slide relative to the second connecting rod;
a swing arm assembly, where the swing arm assembly includes a first swing arm and a second swing arm that are arranged on two sides of the principal axis along the width direction of the principal axis, the first swing arm and the second swing arm can rotate relative to the principal axis, the first bracket and the first swing arm are connected through a first rotating shaft, and the second bracket and the second swing arm are connected through a second rotating shaft; and
a support plate assembly, where the support plate assembly includes a first support plate and a second support plate that are arranged on two sides of the principal axis along the width direction of the principal axis, the first support plate is rotatably connected to the first bracket, the first support plate is slidably connected to the first swing arm or the first connecting rod and can rotate relative to each other, the second support plate is rotatably connected to the second bracket, and the second support plate is slidably connected to the second swing arm or the second connecting rod and can rotate relative to each other, where
rotation axis centers of the first connecting rod and the first swing arm on the principal axis are parallel to each other and do not overlap, and rotation axis centers of the second connecting rod and the second swing arm on the principal axis are parallel to each other and do not overlap;
the folding apparatus includes at least a folded state and an expanded state, and when the folding apparatus is in the expanded state, the first outer end part is in a first position, the second outer end part is in a second position, an axis of the first rotating shaft is located on a side that is of the first position and that is away from the principal axis, and an axis of the second rotating shaft is located on a side that is of the second position and that is away from the principal axis; and
when the first bracket and the second bracket rotate relative to each other, the first bracket drives the first connecting rod and the first swing arm to rotate around the principal axis, and drives an end that is of the first support plate and that is close to the principal axis to move along a direction away from the principal axis, and the second bracket drives the second connecting rod and the second swing arm to rotate around the principal axis, and drives an end that is of the second support plate and that is close to the principal axis to move along the direction away from the principal axis, so that a preset included angle is formed when the first support plate and the second support plate are in the folded state, and the first support plate, the second support plate, and the principal axis jointly enclose screen accommodating space.

In this solution, a distance between the first rotating shaft of the first swing arm and the principal axis and a distance between the second rotating shaft of the second swing arm and the principal axis both increase, to reduce a radian rotated by an end that is of the first swing arm and that is close to the principal axis in a folding process of the folding apparatus, reduce a radian rotated by an end that is of the second swing arm and that is close to the principal axis, reduce a risk of interference between the first support plate and the end that is of the first swing arm and that is close to the principal axis, and reduce a risk of interference between the second support plate and the end that is of the second swing arm and that is close to the principal axis. In this way, an avoidance hole used to avoid the first swing arm does not need to be disposed on the first support plate, and an avoidance hole used to avoid the second swing arm does not need to be disposed on the second support plate. This improves structural strength of the first support plate and the second support plate and support reliability of the first support plate and the second support for the flexible display. In addition, when the first rotating shaft is located on an outer side (away from the principal axis) of the first position, the first bracket does not stick with the first connecting rod in a rotation process, and the distance between the first rotating shaft and the principal axis is large. In the folding process of the folding apparatus, the first swing arm and the first support plate can be prevented from being stuck. When the second rotating shaft is located on an outer side (away from the principal axis) of the second position, the second bracket does not stick with the second connecting rod in a rotation process, and the distance between the second rotating shaft and the principal axis is large. In the folding process of the folding apparatus, the second swing arm and the second support plate can be prevented from being stuck. Therefore, in this application, the positions of the first rotating shaft and the second rotating shaft enable the folding apparatus to work normally while preventing interference between the swing arm assembly and the support plate assembly, so as to avoid disposing an avoidance hole that avoids the swing arm assembly on the support plate assembly, and improve support reliability of the folding apparatus for the flexible display.

In a possible design, one of the first connecting rod and the first bracket is provided with a first sliding block, the other is provided with a first track, and the first sliding block can slide along the first track; and one of the second connecting rod and the second bracket is provided with a second sliding block, the other is provided with a second track, and the second sliding block can slide along the second track; and the first track has a third outer end part away from the principal axis, the second track has a fourth outer end part away from the principal axis, the axis of the first rotating shaft is located on a side that is of the third outer end part and that is away from the principal axis, and the axis of the second rotating shaft is located on a side that is of the fourth outer end part and that is away from the principal axis.

The first bracket has a fifth outer end part away from the principal axis, and the second bracket has a sixth outer end part away from the principal axis; and the first rotating shaft is disposed on the fifth outer end part, and a sixth rotating shaft is disposed on the fourth outer end part.

In this solution, when the axis of the first rotating shaft is located in the fifth outer end part that is of the first bracket and that is away from the principal axis, and the axis of the second rotating shaft is located in the sixth outer end part that is of the second bracket and that is away from the principal axis, because the fifth outer end part is a position at which a distance between the first bracket and the principal axis is maximum, and the sixth outer end part is a position at which a distance between the second bracket and the principal axis is maximum, the distance between the first rotating shaft and the principal axis and the distance between the second rotating shaft and the principal axis can be increased. In this way, interference between the swing arm assembly and the support plate assembly can be prevented, so as to avoid disposing the avoidance hole that avoids the swing arm assembly on the support plate assembly, and improve support reliability of the folding apparatus for the flexible display.

In a possible design, the first swing arm has a seventh outer end part away from the principal axis, and the second swing arm has an eighth outer end part away from the principal axis; and the first rotating shaft is disposed on the seventh outer end part, and the second rotating shaft is disposed on the eighth outer end part.

In this solution, when the axis of the first rotating shaft is located in the seventh outer end part that is of the first swing arm and that is away from the principal axis, and an axis of the second swing arm is away from the eighth outer end part of the principal axis, because the seventh outer end part is a position at which a distance between the first swing arm and the principal axis is maximum, and the eighth outer end part is a position at which a distance between the second swing arm and the principal axis is maximum, the distance between the first rotating shaft (a rotating shaft between the first swing arm and the first bracket) and the principal axis and the distance between the second rotating shaft (a rotating shaft between the second swing arm and the second bracket) and the principal axis can be increased. In this way, interference between the swing arm assembly and the support plate assembly can be prevented, so as to avoid disposing the avoidance hole that avoids the swing arm assembly on the support plate assembly, and improve support reliability of the folding apparatus for the flexible display.

In a possible design, the first bracket has a fifth outer end part away from the principal axis, the second bracket has a sixth outer end part away from the principal axis, the first swing arm has a seventh outer end part away from the principal axis, and the second swing arm has an eighth outer end part away from the principal axis; and the fifth outer end part and the seventh outer end part are rotatably connected through the first rotating shaft, and the sixth outer end part and the eighth outer end part are rotatably connected through the second rotating shaft.

In this solution, a position of the axis of the first rotating shaft is a position at which a distance between the first swing arm and the principal axis and a distance between the first bracket and the principal axis are both maximum, and a position of the axis of the second rotating shaft is a position at which a distance between the second swing arm and the principal axis and a distance between the second bracket and the principal axis are both maximum. Therefore, the distance between the first rotating shaft and the principal axis is large, and the distance between the second rotating shaft and the principal axis is large. In this way, interference between the swing arm assembly and the support plate assembly can be prevented, so as to avoid disposing the avoidance hole that avoids the swing arm assembly on the support plate assembly, and improve support reliability of the folding apparatus for the flexible display.

In a possible design, a first arc groove and a second arc groove are respectively disposed on two sides of the principal axis along the width direction, a first rotation part is disposed on the first swing arm, and a second rotation part is disposed on the second swing arm; and the first rotation part can move along the first arc groove, and the second rotation part can move along the second arc groove.

In this solution, when relative rotation between the first swing arm and the principal axis is implemented through cooperation between the first rotation part and the first arc groove, and relative rotation between the second swing arm and the principal axis is implemented through cooperation between the second rotation part and the second arc groove, reliability of relative rotation between the first swing arm and the principal axis and between the second swing arm and the principal axis is high, and rotation centers of the first swing arm and the second swing arm can be changed by changing centers of the first arc groove and the second arc groove, so as to facilitate control of motion tracks of the first swing arm and the second swing arm. In addition, in a virtual axis connection manner, a connection structure between the first swing arm and the principal axis may be hidden in the principal axis, to improve integration and use experience of the folding apparatus.

In a possible design, a third arc groove is disposed on the first bracket, and a third rotation part is disposed on the first support plate, where the third rotation part can slide along the third arc groove, so that the first support plate rotates relative to the first bracket; and a fourth arc groove is disposed on the second bracket, and a fourth rotation part is disposed on the second support plate, where the fourth rotation part can slide along the fourth arc groove, so that the second support plate rotates relative to the second bracket.

In this solution, when relative rotation between the first support plate and the first bracket is implemented through cooperation between the third rotation part and the third arc groove, and relative rotation between the second support plate and the second bracket is implemented through cooperation between the fourth rotation part and the fourth arc groove, reliability of relative rotation between the first support plate and the first bracket and between the second support plate and the second bracket is high, and the third rotation part, the third arc groove, the fourth rotation part, and the fourth arc groove can be hidden by using the virtual axis connection manner, to improve integrity of the folding apparatus.

In a possible design, the folding apparatus further includes a tension assembly, and when the folding apparatus is in the expanded state, the tension assembly is configured to drive the first bracket and the second bracket to move back to back.

In this solution, when the folding apparatus is in the expanded state, the tension assembly can provide tension force, to push the first bracket and the second bracket to be away from each other, so that the folding apparatus remains in the expanded state, and the flexible display is flattened. In other words, a crease of the flexible display is flattened. This further reduces a crease of the electronic device.

In a possible design, the tension assembly includes two tension groups, one tension group is disposed between the first connecting rod and the first bracket, one tension group is disposed between the second connecting rod and the second bracket, and each tension group includes a pushing piece and a driving piece; and when the folding apparatus is in the expanded state, under an action of the driving piece in each tension group, the pushing piece in each tension group separately pushes the first bracket and the second bracket to move back to back.

In a possible design, each tension group further includes a guiding piece, the guiding piece in each tension group is provided with a guiding hole, the pushing piece in each tension group includes a sliding part, and the sliding part in each tension group is slidingly cooperated with the guiding hole, to limit a travel of the pushing piece in the tension group.

In this solution, in each tension group, the guiding piece and the driving piece are located at two ends of the pushing piece. In other words, the guiding piece is located at an end close to the bracket assembly. When the sliding part of the pushing piece is slidingly cooperated with the guiding hole of the guiding piece, a movement journey of the pushing piece can be limited by using the guiding piece, so as to prevent excessively large push force of the pushing piece from acting on the bracket assembly when the movement journey of the pushing piece is excessively large. This improves reliability of the bracket assembly, and the guiding piece guides a movement of the driving piece, to prevent the pushing piece from deviation.

In a possible design, the driving piece in each tension group is an elastic piece, one end of the elastic piece in each tension group is connected to the pushing piece in the tension group, and the other end of the elastic piece in each tension group is connected to the first connecting rod or the second connecting rod.

In this solution, when the folding apparatus is in the expanded state, the elastic part of each tension group is in a compressed state. In other words, the elastic part has elastic force outward (away from the principal axis) along the width direction of the principal axis. The elastic force acts on the connecting rod assembly and the bracket assembly, so as to drive the bracket assembly to have a movement trend outward (away from the principal axis) along the width direction of the principal axis. This facilitates the folding apparatus to be flattened. In the folding process of the folding apparatus, because the bracket assembly slides outward (away from the principal axis) relative to the connecting rod assembly, a compression amount of the elastic part of each tension group can be driven to decrease or restore to an initial state or extend, so as to reduce push force of the pushing piece of each tension group acting on the bracket assembly or release push force of the pushing piece on the bracket assembly. When the folding apparatus is in the folded state, each piece of the tension assembly is retracted to an inner cavity of the bracket assembly and the connecting rod assembly. In other words, the tension assembly does not occupy external space of the folding apparatus. This improves integrity of the folding apparatus.

In a possible design, the folding apparatus further includes a synchronization gear group, the synchronization gear group includes a first gear, a second gear, a third gear, and a fourth gear that are arranged along the width direction of the principal axis, the first gear is engaged with the third gear, the second gear is engaged with the fourth gear, and the third gear is engaged with the fourth gear;

the principal axis includes a principal inner axis and a principal outer axis that are connected, and along a height direction of the principal axis, the synchronization gear group is located between the principal inner axis and the principal outer axis;

the first support plate has a first extension segment extending along the width direction of the principal axis toward the principal axis, the second support plate has a second extension segment extending along the width direction of the principal axis toward the principal axis, and two ends of the principal inner axis along the width direction of the principal axis respectively have a first notch adapting to the first extension segment and a second notch adapting to the second extension segment; and along a length direction of the principal axis, the first gear is disposed at at least one end of the first connecting rod, the first gear is staggered with the first extension segment, the second gear is disposed at at least one end of the second connecting rod, and the second gear is staggered with the second extension segment.

In this solution, along the length direction of the principal axis, the first gear is located at at least one end of the first connecting rod, so that the first gear is staggered with the first notch along the length direction of the principal axis. The second gear is located at at least one end of the second connecting rod, so that the second gear is staggered with the second notch along the length direction of the principal axis. In addition, the first support plate is provided with the first extension segment extending toward the principal axis along the width direction of the principal axis, the second support plate is provided with the second extension segment extending toward the principal axis along the width direction of the principal axis, the first extension segment adapts to the first notch of the principal inner axis, and the second extension segment adapts to the second notch of the principal inner axis, so that the first extension segment can fill the first notch, and the second extension segment can fill the second notch. When the first support plate, the second support plate, and the principal inner axis form a support surface used to support the flexible display, an opening of the support surface can be reduced, to improve support reliability of the folding apparatus.

In a possible design, the folding apparatus further includes a synchronization gear group, the synchronization gear group includes a first gear, a second gear, a third gear, and a fourth gear that are arranged along the width direction of the principal axis, the first gear is engaged with the third gear, the second gear is engaged with the fourth gear, and the third gear is engaged with the fourth gear;

the principal axis includes a principal inner axis and a principal outer axis that are connected, along a height direction of the principal axis, the synchronization gear group is located between the principal inner axis and the principal outer axis, and two ends of the principal inner axis along the width direction of the principal axis respectively have a first notch and a second notch; and a first platform is disposed at an end that is of the first connecting rod and that is close to the principal axis, a second platform is disposed at an end that is of the second connecting rod and that is close to the principal axis, and when the folding apparatus is in an expanded state, at least a part of the first platform is located in the first notch, and at least a part of the second platform is located in the second notch, so that the first platform, the second platform, the first support plate, and the second support plate form a support surface used to support a flexible display.

In this solution, when the folding apparatus is in the expanded state, the first platform is filled in the first notch (namely, a gap between the first support plate and the principal axis) of the principal inner axis, and the second platform is filled in the second notch (namely, a gap between the second support plate and the principal axis) of the principal inner axis. In other words, the first support plate, the first platform, the principal axis, the second platform, and the second support plate form a plane used to support the flexible display, and support reliability of the folding apparatus for the flexible display at a joint between the support plate assembly and the connecting rod assembly can be improved by disposing the first platform and the second platform.

In a possible design, a first stopper and a third stopper are disposed on the first connecting rod, and a second stopper and a fourth stopper are disposed on the second connecting rod;

when the folding apparatus is in the expanded state, the first stopper presses against the first bracket, to limit the first bracket and the first connecting rod to move relative to each other along the width direction of the principal axis, and the second stopper presses against the second bracket, to limit the second bracket and the second connecting rod to move relative to each other along the width direction of the principal axis; and when the folding apparatus is in the folded state, the third stopper presses against the first support plate, to limit the first connecting rod and the first support plate to move relative to each other along the height direction of the principal axis, and the fourth stopper presses against the second support plate, to limit the second connecting rod and the second support plate to move relative to each other along the height direction of the principal axis.

In this solution, when the electronic device falls in the expanded state, the first bracket and the second bracket can be prevented from approaching each other along the width direction of the principal axis by using the first stopper and the first bracket that press against each other, and the second stopper and the second bracket that press against each other, so that the folding apparatus maintains in the expanded state, and reliability of the folding apparatus and the electronic device in the expanded state is improved. When the electronic device falls in the folded state, the third stopper and the first support plate that press against each other, and the fourth stopper and the second support plate that press against each other are used. In this way, when the first support plate and the second support plate are impacted by impact force in the height direction of the principal axis, the principal axis can be prevented from impacting by the impact force, to improve reliability of the folding apparatus and the electronic device in the folded state.

In a specific embodiment, the first stopper and the third stopper protrude from the first connecting rod along the length direction of the principal axis, and the second stopper and the fourth stopper protrude from the second connecting rod along the length direction of the principal axis;

a fifth stopper extending along the height direction of the principal axis is disposed on the first support plate, and a sixth stopper extending along the height direction of the principal axis is disposed on the second support plate;

when the folding apparatus is in the expanded state, the first stopper presses against an end face that is of the first bracket and that is close to the principal axis, and the second stopper presses against an end face that is of the second bracket and that is close to the principal axis; and when the folding apparatus is in the folded state, the third stopper presses against the fifth stopper, and the fourth stopper presses against the sixth stopper.

In this solution, when the folding apparatus is in the expanded state, the first stopper presses against the end face that is of the first bracket and that is close to the principal axis, and the second stopper presses against the end face that is of the second bracket and that is close to the principal axis, without changing structures of the first bracket and the second bracket, to simplify a structure of the folding apparatus. When the folding apparatus is in the folded state, because the fifth stopper is disposed on the first support plate, the sixth stopper is disposed on the second support plate, the third stopper presses against the fifth stopper of the first support plate, and the fourth stopper presses against the sixth stopper of the second support plate, the first connecting rod presses against the first support plate and the second connecting rod presses against the second support plate.

In a possible design, a third track is disposed on the first support plate, and a fourth track is disposed on the second support plate;
- a first hinge pin that can slide along the third track is disposed on the first connecting rod or the first swing arm, and a second hinge pin that can slide along the fourth track is disposed on the second connecting rod or the second swing arm;
- the third track has a first end and a second end that are oppositely disposed, the fourth track has a third end and a fourth end that are oppositely disposed, the second end is located between the first end and the principal axis, and the fourth end is located between the third end and the principal axis; and
- when the folding apparatus is in the expanded state, the first hinge pin is located at the first end, and the second hinge pin is located at the third end; and when the folding apparatus is in the folded state, the first hinge pin is located at the second end, and the second hinge pin is located at the fourth end.

In this solution, in a process in which the folding apparatus is switched from the expanded state to the folded state, that is, in a process in which the first bracket 11 and the second bracket rotate face to face (in other words, the first bracket and the second bracket rotate relative to each other in a close manner), the first hinge pin slides from the first end of the third track to the second end of the third track, and the second hinge pin slides from the third end of the fourth track to the fourth end of the fourth track. Because the second end is closer to the principal axis than the first end, in this process, the first support plate can slide in a direction away from the principal axis relative to the first connecting rod or the first swing arm, and the second support plate can slide in a direction away from the principal axis relative to the second connecting rod or the second swing arm, to increase a contour length of the accommodating space. In a process in which the folding apparatus switches from the folded state to the expanded state, that is, in a process in which the first bracket and the second bracket rotate back to back, the first hinge pin slides from the second end of the third track to the first end of the third track, and the second hinge pin slides from the fourth end of the fourth track to the third end of the fourth track. Because the fourth end is closer to the principal axis than the third end, in this process, the first support plate can slide in a direction close to the principal axis relative to the first connecting rod or the first swing arm, the second support plate can slide in a direction close to the principal axis relative to the second connecting rod or the second swing arm, to reduce a contour length of the accommodating space.

A second aspect of this application provides an electronic device. The electronic device includes a first housing, a second housing, a flexible display, and the folding apparatus described above.

The first housing and the second housing are located on two sides of the folding apparatus, the first housing is fastened or connected to the first bracket located on a same side, and the second housing is fastened or connected to the second bracket located on a same side; and the flexible display covers the first housing, the second housing, and the folding apparatus, and is fastened or connected to the first housing and the second housing.

In this solution, the electronic device can be in an expanded state or a folded state driven by the folding apparatus. In addition, in a process in which the folding apparatus switches from the expanded state to the folded state, because a first rotatable rack and a second rotatable rack that are connected to the first housing and the second housing can rotate face to face and move in a direction away from a mounting bracket, accommodating space of the folding apparatus in the folded state can be increased, and squeezing of the folding apparatus on the flexible display when the electronic device in the folded state can be reduced, to improve reliability of the flexible display. In addition, when the accommodating space has sufficient space, the flexible display can be further prevented from arching in the accommodating space, to improve flatness of the flexible display in the folded state.

In a possible design, the flexible display is fastened or connected to at least a part of the support plate assembly.

In a possible design, the flexible display includes a third area, a fourth area, and a fifth area. The fifth area is located between the third area and the fourth area. The support plate assembly includes a first support plate and a second support plate that are disposed along a width direction of the mounting bracket, the third area is not fastened or connected to the first support plate, the fourth area is not fastened or connected to the second support plate, and the fifth area is not fastened or connected to the folding apparatus. In this solution, when the electronic device is in the folded state, the third area, the fourth area, and the fifth area are folded to form a water drop structure. In other words, the folded part is in a water drop shape, and the fifth area is in a semi-arc shape after being folded. In addition, because the third area, the fourth area, and the fifth area of the flexible display are not fastened or connected to the folding apparatus, the folding apparatus can be prevented from stretching the flexible display in a folding or expanding process, to improve reliability of the flexible display.

In a possible design, the flexible display includes a third area, a fourth area, and a fifth area. The fifth area is located between the third area and the fourth area. The support plate assembly includes a first support plate and a second support plate that are disposed along a width direction of the mounting bracket, the third area is fastened or connected to the first support plate, the fourth area is fastened or connected to the second support plate, and the fifth area is not fastened or connected to the support apparatus. In this solution, when the electronic device is in the folded state, the fifth area encloses a semi-arc shape. When the third area is fastened or connected to the first support plate, and the fourth area is fastened or connected to the second support plate, in a folding or expanding process of the electronic device, the third area can move with the first support plate, and the fourth area can move with the second support plate. In other words, the third area does not move relative to the first support plate. This improves flatness of the folded part of the flexible display in the folding and folding processes, and reduces a risk of a flexible display failure.

It should be understood that the foregoing general description and the following detailed description are merely examples, and cannot limit this application.

REFERENCE NUMERALS

1': flexible display;
1: folding apparatus, 111: first bracket, 111a: first track, 111b: third arc groove, 111c: fifth outer end part; 112: second bracket, 112a: second track, 112b: fourth arc groove, 112c: sixth outer end part, and 113: rotating shaft cover;
12: swing arm assembly, 121: first swing arm, 121a: first rotating shaft, 121b: first rotation part, 121c: first hinge pin, 121d: third rotating shaft, 121e: seventh outer end part; 122: second swing arm, 122a: second rotating shaft, 122b: second rotation part, 122c: second hinge pin, 122d: fourth rotating shaft, and 122e: eighth outer end part;
13: connecting rod assembly, 131: first connecting rod, 131a: first sliding block, 131b: first platform, 131c: first stopper, 131d: third stopper, 131e: fifth rotating shaft, and 131f: first outer end part; 132: second connecting rod, 132a: second sliding block, 132b: second platform, 132c: second stopper, 132d: fourth stopper, 132e: sixth rotating shaft, 132f: second outer end, 134: mounting cavity, and 134a: mounting column;
14: principal axis, 141: principal inner axis, 141a: first notch, 141b: second notch, 142: principal outer axis, 143: first arc groove, and 144: second arc groove;
15: tension assembly, 151: pushing piece, 151a: convex plate, 151b: sliding part, 152: driving piece, 153: guiding piece, and 153a: guiding hole;
16: synchronization damping assembly, 161: first gear, 162: second gear, 163: third gear, 164: fourth gear, 165: second concave convex surface, 166: clamping piece, 1661: gasket, 167: first elastic piece, 168: third hinge pin, 168a: clamping slot, and 169: cam;
171: first support plate, 1711: third rotation part, 1712: fifth stopper, 1713: third track, 1714: first extension segment, 172: second support plate, 1721: fourth rotation part, 1722: sixth stopper, 1723: fourth track, 1724: second extension segment, and 174: accommodating space;
2: flexible display, 21: first area, 22: second area, 23: third area, 24: fourth area, 25: fifth area, and 26: folded part;
31: first housing, 311: first groove, 32: second housing, and 321: second groove; and
A: first position, B: second position, C: third outer end part, and D: fourth outer end part.

The accompanying drawings herein are incorporated into the specification and constitute a part of the specification, show embodiments conforming to this application, and are used together with the specification to explain a principle of this application.

DESCRIPTION OF EMBODIMENTS

To better understand the technical solutions of this application, the following describes embodiments of this application in detail with reference to the accompanying drawings.

Figure 1:
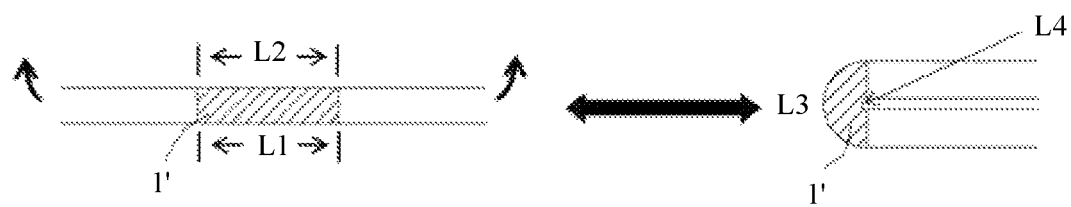
FIG. 1 is a schematic diagram of expanding and folding a part of a flexible display in a specific embodiment in the conventional technology.

FIG. 1 shows a partial structure of a flexible display 1' in the conventional technology. The partial structure is a part of the flexible display 1' that cooperates with a folding assembly. When a folding electronic device is in an expanded state, a length of an outer side of the part of the flexible display 1' is L1, and a length of an inner side of the part of the flexible display 1' is L2. In this case, L1=L2, that is, in the expanded state, lengths of sides of the flexible display 1' are the same, and the flexible display 1' is not stretched or compressed. After the flexible display 1' is folded along an arrow shown in FIG. 1 under driving of the folding assembly, the inner side length L2 of the flexible display 1' changes to L4, and the outer side length L1 of the flexible display 1' changes to L3, where L4<L2, and L3>L1. In other words, in a folding process, the inner side of the flexible display 1' is compressed, the outer side is stretched, and a length of a middle layer of the flexible display 1' along a thickness direction changes in the folding process. Therefore, when the flexible display 1' is folded for a plurality of times, there is a risk that the flexible display 1' is damaged due to a plurality of times of stretching and compression.

To resolve the technical problem, an embodiment of this application provides an electronic device. An embodiment of this application provides an electronic device shown in FIG. 2. The electronic device includes any device having a foldable screen function, such as a mobile phone, a tablet computer, a personal digital assistant (personal digital assistant, PDA), a notebook computer, a vehicle-mounted computer, a foldable display device, a foldable display, or a wearable device. A specific form of the foregoing electronic device is not specially limited in this embodiment of this application. For ease of description, the following uses an example in which the electronic device is the mobile phone for description. The following describes the electronic device in this application by using specific embodiments.

Figure 2:
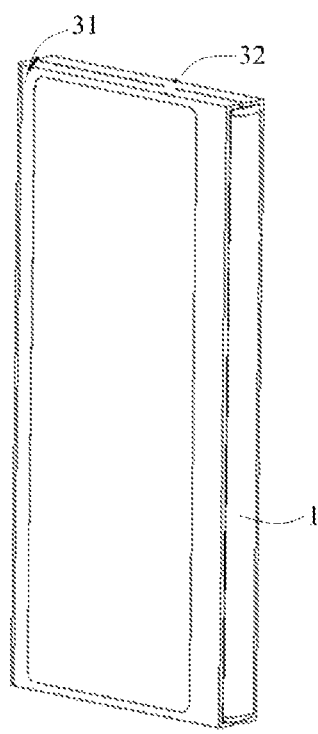
FIG. 2 is a schematic diagram of a structure of an electronic device according to a specific embodiment of this application, where a folding apparatus is in a folded state.
Figure 3:
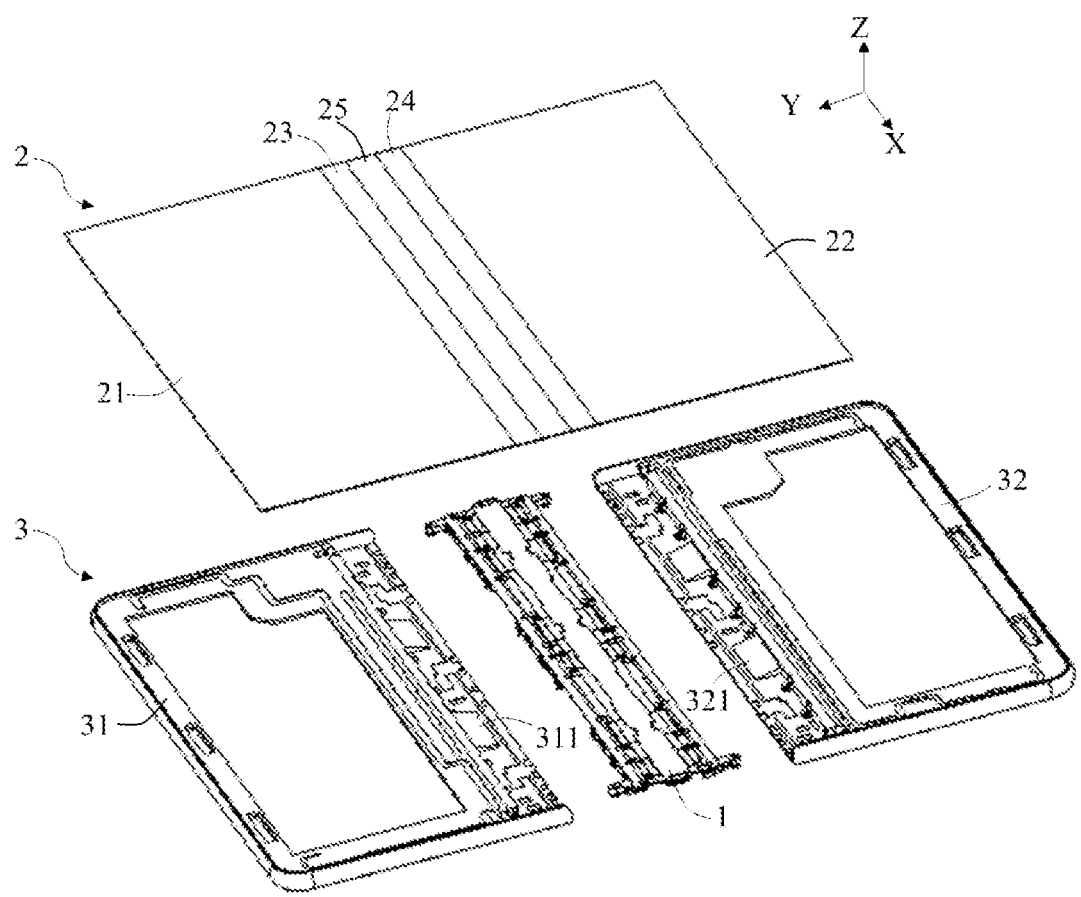
FIG. 3 is an exploded view of an electronic device according to a specific embodiment of this application, where a folding apparatus is in an expanded state.

As shown in FIG. 2 and FIG. 3, the electronic device includes a folding apparatus 1, a screen, a first housing 31, and a second housing 32. The screen may be a flexible display 2, and the flexible display 2 is configured to display an image, a video, and the like. A specific type of the flexible display 2 in this application is not limited. For example, the flexible display 2 may be an active matrix organic light-emitting diode or an active matrix organic light-emitting diode (active matrix organic light-emitting diode, AMO-LED) display. The AMOLED display is used as a self-luminous display, and a back light module (back light module, BLM) does not need to be disposed. Therefore, when a substrate of the AMOLED display is made of a flexible resin material, such as polyethylene terephthalate (polyethylene terephthalate, PET), the AMOLED display can have a bendable characteristic. For example, the flexible display 2 may alternatively be an organic light-emitting diode (organic light-emitting diode, OLED) display, a mini light-emitting diode (mini light-emitting diode) display, a mini light-emitting diode (micro light-emitting diode) display, a micro organic light-emitting diode (micro organic light-emitting diode) display, a quantum dot light-emitting diode (quantum dot light-emitting diodes, QLED) display, or the like.

As shown in FIG. 3, the first housing 31 and the second housing 32 are distributed at an interval, and the first housing 31 and the second housing 32 may further be middle frame structures of the electronic device. The first housing 31 and the second housing 32 are used to install components such as a battery, a circuit board, a camera, a headset, an earpiece, a button, and a battery of the electronic device. The first housing 31 and the second housing 32 are further configured to carry the flexible display 2. In other words, the flexible display 2 is fastened or connected (for example, pasted) to the first housing 31 and the second housing 32, so that the flexible display 2 is kept as flat as possible in a use process, and a non-display surface of the flexible display 2 is protected. The folding apparatus 1 is located between the first housing 31 and the second housing 32, and is connected to the first housing 31 and the second housing 32. Specifically, as shown in FIG. 3, a first groove 311 is disposed on the first housing 31, a second groove 321 is disposed on the second housing 32, one part of the folding apparatus 1 is installed in the first groove 311, and the other part is installed in the second groove 321. In some possible implementations, the folding apparatus 1 may be connected to the first groove 311 and the second groove 321 by using a screw or the like.

Figure 4:
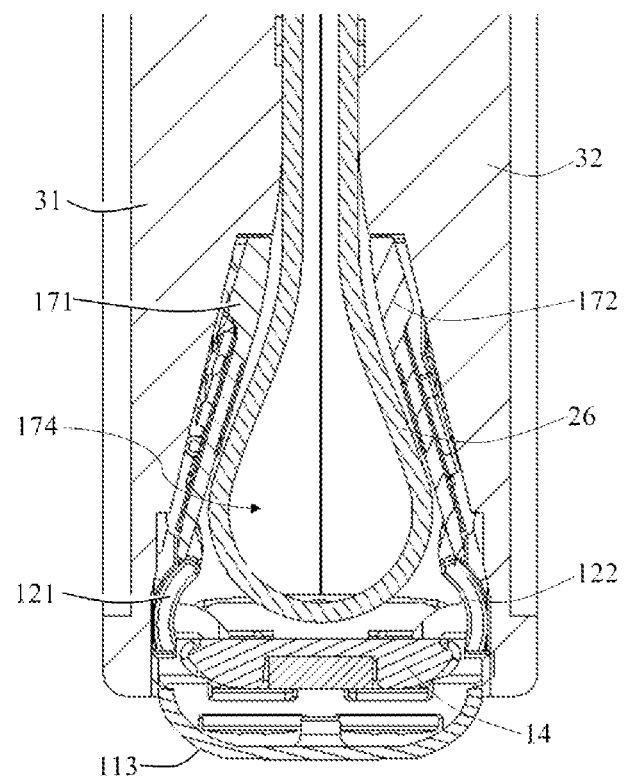
FIG. 4 is a partial view of a sectional view of an electronic device in FIG. 2 in a specific embodiment.
Figure 5:
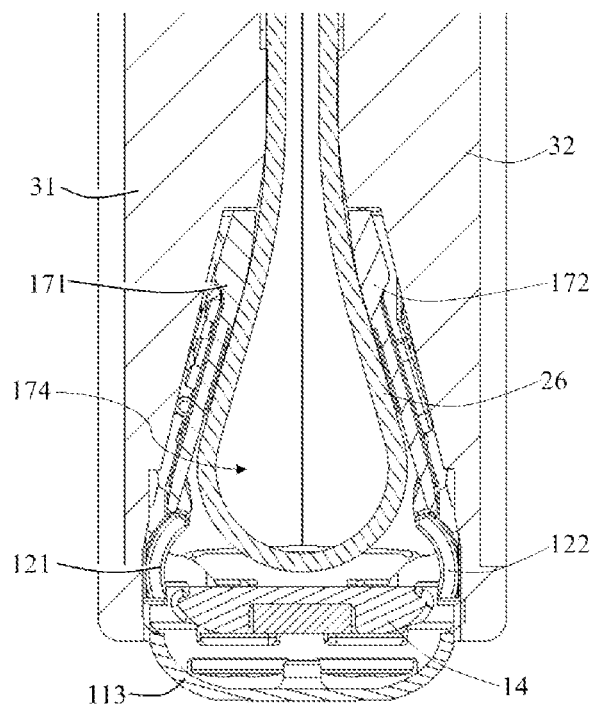
FIG. 5 is a partial view of a sectional view of an electronic device in FIG. 2 in another specific embodiment.
Figure 6:
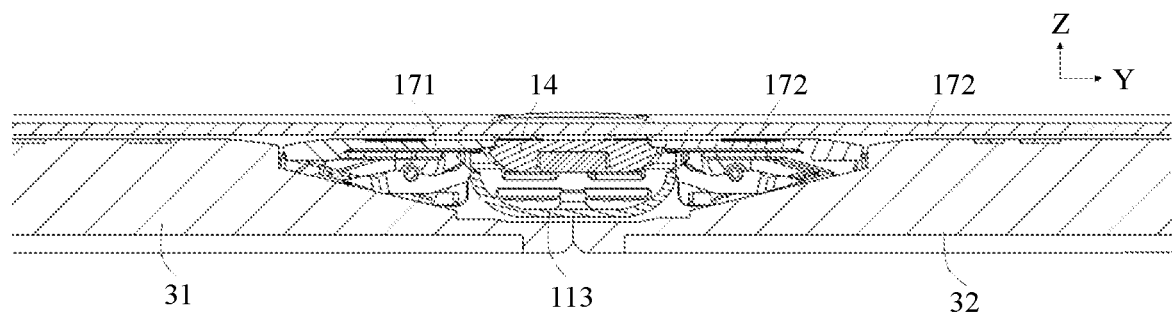
FIG. 6 is a partial view of a sectional view of an electronic device in FIG. 3 in a specific embodiment.

In a process of using the electronic device, the folding apparatus 1 includes at least the expanded state shown in FIG. 4 and FIG. 5 and the expanded state shown in FIG. 6. In the expanded state, the first housing 31 and the second housing 32 are roughly located in a same plane, so that the flexible display 2 is roughly a plane. In this case, the flexible display 2 is exposed, a user can operate the flexible display 2, and the flexible display 2 can display information such as an image or a video, to implement large-screen display and improve user viewing experience. In addition, when the folding apparatus 1 is in the expanded state, the first housing 31 and the second housing 32 can rotate face to face (in other words, the first housing 31 and the second housing 32 rotate relative to each other in a close manner), so that the folding apparatus 1 can be folded. In a folding process, an end that is of the first housing 31 and that is away from the folding apparatus 1 and an end that is of the second housing 32 and that is away from the folding apparatus 1 are mutually close, so that the electronic device is in the folded state shown in FIG. 4. In addition, the electronic device in this embodiment is a flexible display inner folding structure. In the folded state, the flexible display 2 is located in space enclosed by the first housing 31 and the second housing 32 that are folded. In this case, the flexible display 2 is not exposed, the user cannot operate the flexible display 2, and the electronic device is easy to accommodate and carry. In addition, when the folding apparatus 1 is in the folded state, the first housing 31 and the second housing 32 can rotate (rotation directions are opposite to rotation directions during folding), to drive the folding apparatus 1 to expand, so that the electronic device is in an expanded state shown in FIG. 6. Therefore, in this application, the folding apparatus 1 is configured to implement folding and expanding of the electronic device.

A person skilled in the art may understand that the schematic structure in this embodiment of this application does not constitute a specific limitation on the electronic device. In other embodiments of this application, the electronic device may include more or fewer components than those shown in the figure, or combine some components, or split some components, or have a different component arrangement.

As shown in FIG. 3, the flexible display 2 may include a first part 21, a second part 22, and a third part 23, a fourth part 24, and a fifth part 25 that are located between the first part 21 and the second part 22. The first part 21 corresponds to and is connected to the first housing 31, the second part 22 corresponds to and is connected to the second housing 32, and the third part 23, the fourth part 24, and the fifth part 25 correspond to the folding apparatus 1. In a folding process of the folding apparatus 1, the third part 23, the fourth part 24, and the fifth part 25 are folded, to form a folded part 26 of the flexible display 2 shown in FIG. 5 and FIG. 6.

As shown in FIG. 4 and FIG. 5, after the folding apparatus 1 is folded, accommodating space 174 is formed, the folded part 26 of the flexible display 2 is accommodated in the accommodating space 174, and a remaining part of the flexible display 2 is accommodated in the first housing 31 and the second housing 32. To improve a service life and reliability of the flexible display 2, pulling and squeezing of the folded part 26 in expanding and folding processes need to be reduced or eliminated. In other words, the folded part 26 needs to be not pulled by external force in the expanding process and not squeezed by external force in the folding process.

Specifically, as shown in FIG. 6, when the folding apparatus 1 is in the expanded state, along a width direction Y of a principal axis 14, a part that is of the folding apparatus 1 and that cooperates with the folded part 26 of the flexible display 2 has a first length. As shown in FIG. 4 and FIG. 5, when the folding apparatus 1 is in the folded state, the folding apparatus 1 forms the accommodating space 174 used to accommodate the folded part 26 of the flexible display 2, a contour length (a circumference) of the accommodating space 174 is a second length, and the first length is less than the second length. Therefore, in a process in which the folding apparatus 1 switches from the expanded state shown in FIG. 6 to the folded state shown in FIG. 4 or FIG. 5, the contour length of the part that is of the folding apparatus 1 and that cooperates with the folded part 26 is increased, so that the folding apparatus 1 can provide a sufficient space to accommodate the folded part 26 of the flexible display 2 in the folded state. This reduces pulling and squeezing of the folded part 26 in the folding process of the folding apparatus 1, and reduces a risk of a function failure of the flexible display 2.

Figure 7:
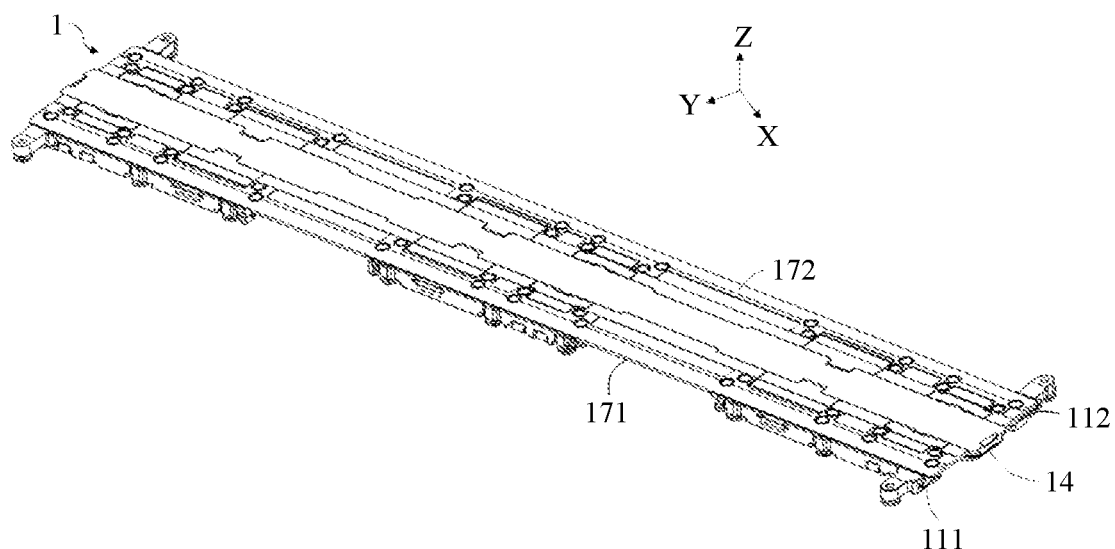
FIG. 7 is a schematic diagram of a structure of a folding apparatus in FIG. 3 in a specific embodiment, where the folding apparatus is in an expanded state.
Figure 8:
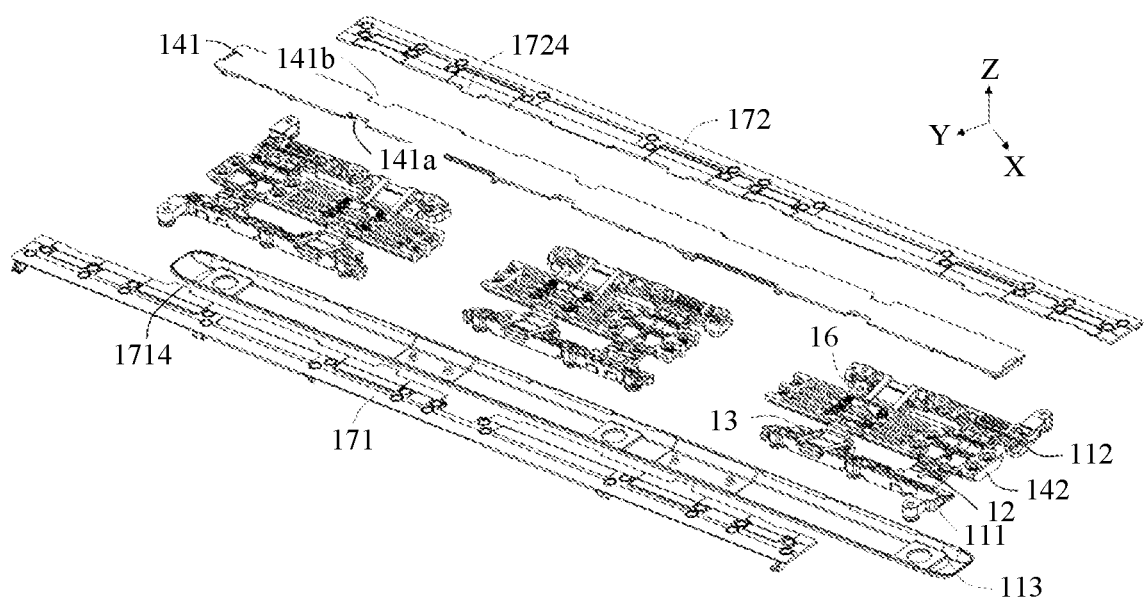
FIG. 8 is an exploded view of FIG. 7.
Figure 9:
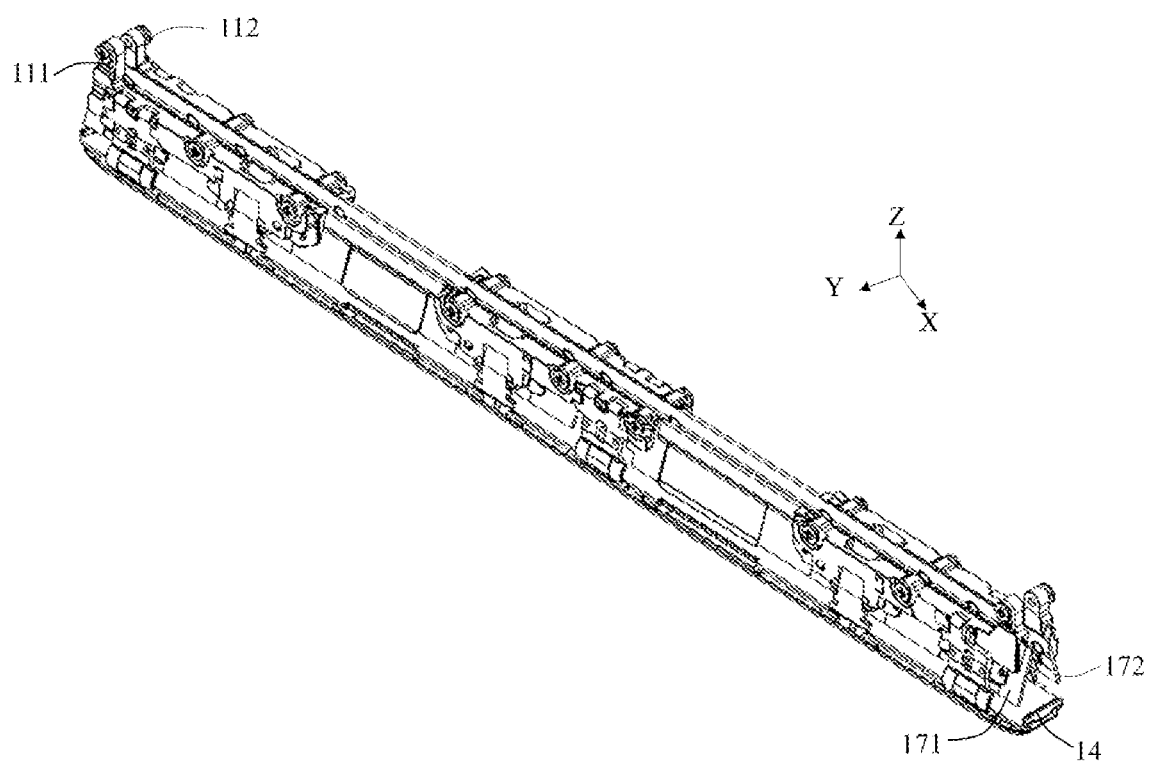
FIG. 9 is a schematic diagram of a structure of a folding apparatus in FIG. 7 in a folded state.

In this application, specifically, the folding apparatus 1 is used to implement that the folded part 26 is not squeezed or stretched by external force in the folding process. As shown in FIG. 7 to FIG. 9, the folding apparatus 1 includes a principal axis 14, and a bracket assembly, a connecting rod assembly 13, a swing arm assembly 12, and a support plate assembly that are connected to the principal axis 14. The principal axis 14 is fastened relative to the first housing 31 and the second housing 32 (referring to FIG. 5) of the electronic device, and the folding apparatus 1 is folded or expanded around the principal axis 14. An extension direction of the principal axis 14 is defined as a length direction X of the principal axis 14. In the electronic device in the expanded state (referring to FIG. 6), an arrangement direction of the first housing 31 and the second housing 32 is defined as a width direction Y of the principal axis 14. A direction perpendicular to both the length direction X and the width direction Y of the principal axis 14 is defined as a height direction Z of the principal axis 14.

It should be noted that, as shown in FIG. 8 and FIG. 9, the folding apparatus 1 may include a plurality of the foregoing support assemblies, a plurality of swing arm assemblies 12, and a plurality of connecting rod assemblies 13, where the plurality of support assemblies are distributed in the length direction X of the principal axis 14, the plurality of swing arm assemblies 12 are distributed in the length direction X of the principal axis 14, and the plurality of connecting rod assemblies 13 are distributed in the length direction X of the principal axis 14. A first support plate 171 and a second support plate 172 are separately connected to the bracket assemblies, the swing arm assemblies 12, and the connecting rod assemblies 13.

Figure 10:
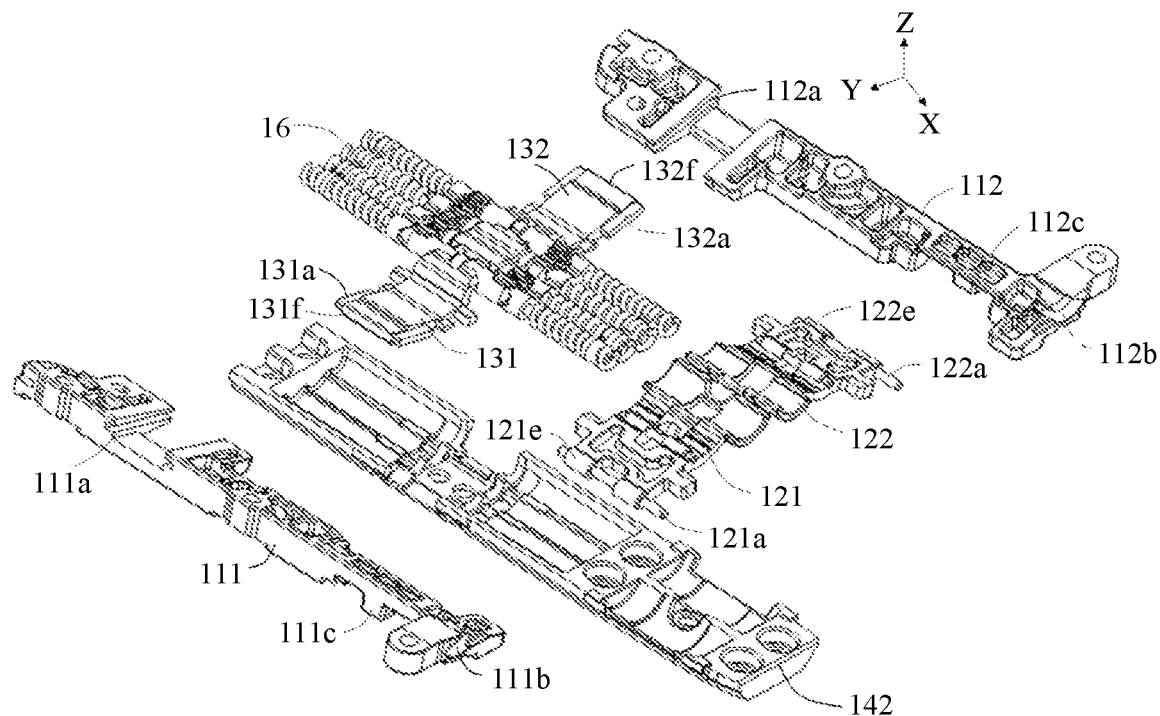
FIG. 10 is an exploded view of a partial structure of a folding apparatus in FIG. 7.
Figure 11:
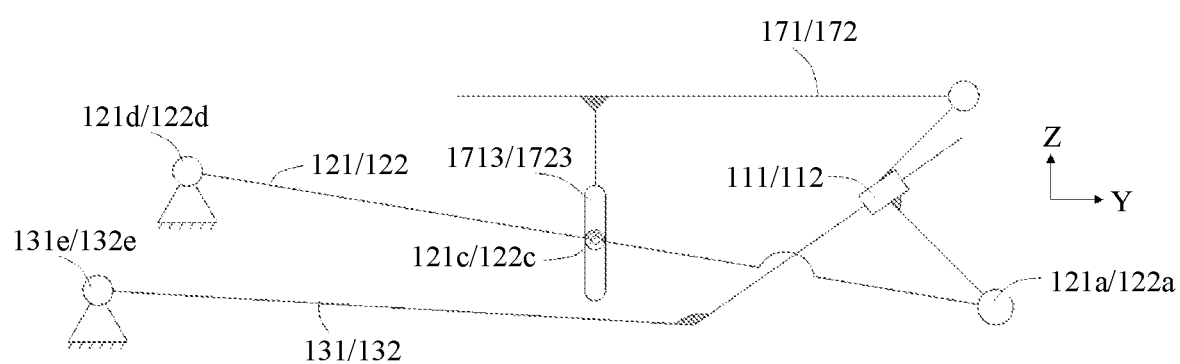
FIG. 11 is a schematic diagram of a folding apparatus shown in FIG. 10 in a specific embodiment.
Figure 12:
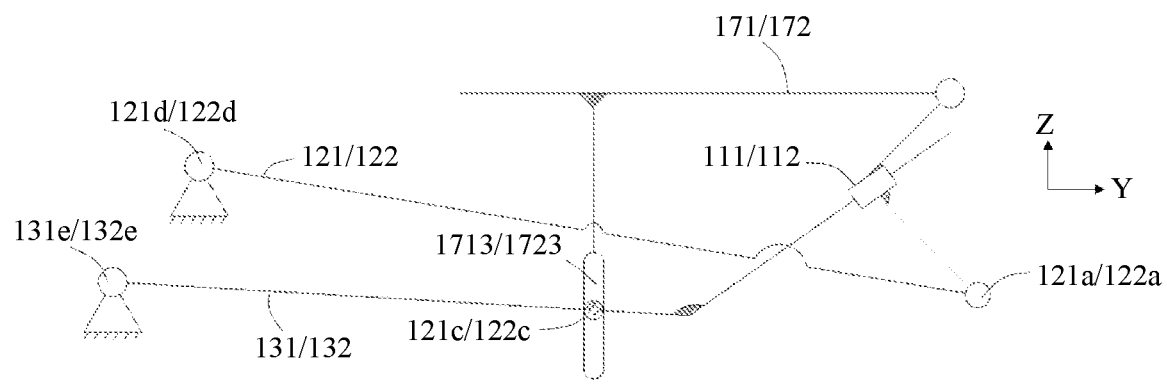
FIG. 12 is a schematic diagram of a folding apparatus shown in FIG. 10 in another specific embodiment.

In addition, as shown in FIG. 10 to FIG. 12, the connecting rod assembly 13 includes a first connecting rod 131 and a second connecting rod 132 that are arranged on two sides of the principal axis 14 along the width direction Y of the principal axis 14. The first connecting rod 131 and the second connecting rod 132 can rotate relative to the principal axis 14. In other words, the first connecting rod 131 is rotatably connected to the principal axis 14 through a fifth rotating shaft 131e, and the second connecting rod 132 is rotatably connected to the principal axis 14 through a sixth rotating shaft 132e. The swing arm assembly 12 includes a first swing arm 121 and a second swing arm 122 that are arranged on two sides of the principal axis 14 along the width direction Y of the principal axis 14. The first swing arm 121 and the second swing arm 122 can rotate relative to the principal axis 14. In other words, the first swing arm 121 is rotatably connected to the principal axis 14 through a third rotating shaft 121d, and the second swing arm 122 is rotatably connected to the principal axis 14 through a fourth rotating shaft 122d. The bracket assembly includes a first bracket 111 and a second bracket 112 that are arranged on two sides of the principal axis 14 along the width direction Y of the principal axis 14. The first bracket 111 can slide along a first track 111a relative to the first connecting rod 131, the first bracket 111 is rotatably connected to the first swing arm 121 through a first rotating shaft 121a, the second bracket 112 can slide along a second track 112a relative to the second connecting rod 132, and the second bracket 112 is rotatably connected to the second swing arm 122 through a second rotating shaft 122a. The fifth rotating shaft 131e (a rotation center of the first connecting rod 131 relative to the principal axis 14) and the third rotating shaft 121d (a rotation center of the first swing arm 121 relative to the principal axis 14) are parallel to each other and do not overlap.

As shown in FIG. 10, the support plate assembly is configured to connect to the flexible display 2 of the electronic device, so that the flexible display 2 can be folded or expanded under driving of the folding apparatus 1. The support plate assembly includes a first support plate 171 and a second support plate 172 that are disposed on two sides of the principal axis 14 along the width direction Y of the principal axis 14. The first support plate 171 and the second support plate 172 are used to connect to the flexible display 2 of the electronic device, and the first support plate 171, the second support plate 172, and the principal axis 14 form the accommodating space 174. Specifically, the first support plate 171 and the second support plate 172 are used to be connected to a folded part of the flexible display 2 (a connection manner may be adhesion). The first support plate 171 is rotatably connected to the first bracket 111. In other words, the first support plate 171 can rotate relative to the first bracket 111. In addition, the first support plate 171 is slidably connected to the first swing arm 121 or the first connecting rod 131 and can rotate relative to each other. The second support plate 172 is rotatably connected to the second bracket 112. In other words, the second support plate 172 can rotate relative to the second bracket 112. In addition, the second support plate 172 is slidingly connected to the second swing arm 122 or the second connecting rod 132 and can rotate relative to each other.

Specifically, as shown in FIG. 11 and FIG. 12, in the folding apparatus 1, the first swing arm 121, the first connecting rod 131, and the first bracket 111 form a sliding block mechanism, and the second swing arm 122, the second connecting rod 132, and the second bracket 112 form a sliding block mechanism. In the embodiment shown in FIG. 11, the first support plate 171 is slidably connected to the first swing arm 121 and can rotate relative to each other, and the second support plate 172 is slidingly connected to the second swing arm 122 and can rotate relative to each other. In the embodiment shown in FIG. 12, the first support plate 171 is slidingly connected to the first connecting rod 131 and can rotate relative to each other, and the second support plate 172 is slidingly connected to the second connecting rod 132 and can rotate relative to each other. The sliding block mechanism formed by the first swing arm 121, the first connecting rod 131, and the first bracket 111 is used as an example. When external force acts on the first bracket 111 to make the first bracket 111 rotate, the first bracket 111 can drive the first connecting rod 131 to rotate around the fifth rotating shaft 131e because the first bracket 111 is slidingly cooperated with the first connecting rod 131. In addition, the first bracket 111 is rotatably connected to the first swing arm 121. Therefore, in a rotating process, the first bracket 111 drives the first swing arm 121 to rotate around the third rotating shaft 121d. Because the fifth rotating shaft 131e and the third rotating shaft 121d do not overlap, the first bracket 111 slides relative to the first connecting rod 131, so that an included angle between the first bracket 111 and the first swing arm 121 changes (in other words, the first bracket 111 and the first swing arm 121 move relative to each other). In this way, a connecting rod mechanism formed by the first bracket 111 and the first swing arm 121 is extended or shortened.

In addition, the first support plate 171 is rotatably connected to the first bracket 111, and the first support plate 171 is slidingly connected to the first connecting rod 131 or the first swing arm 121 and can rotate relative to each other. Therefore, in a rotation process of the first connecting rod 131 and the first swing arm 121, the first support plate 171 can be driven to rotate relative to the first bracket. Specifically, when the first swing arm 121 is slidably connected to the first support plate 171 and can rotate relative to each other, after the included angle between the first swing arm 121 and the first bracket 111 changes, because the first swing arm 121 is slidingly cooperated with the first support plate 171, the first support plate 171 can be driven to rotate and slide relative to the first bracket 111. When the first connecting rod 131 is slidably connected to the first support plate 171 and can rotate relative to each other, after the first bracket 111 slides relative to the first connecting rod 131, because the first connecting rod 131 is slidingly cooperated with the first support plate 171, the first support plate 171 can be driven to rotate and slide relative to the first bracket 111.

Figure 13:
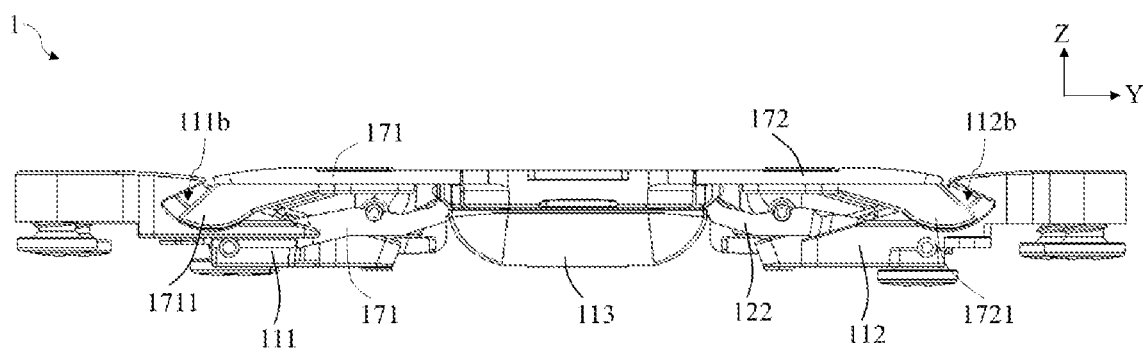
FIG. 13 is a side view of FIG. 7.
Figure 14:
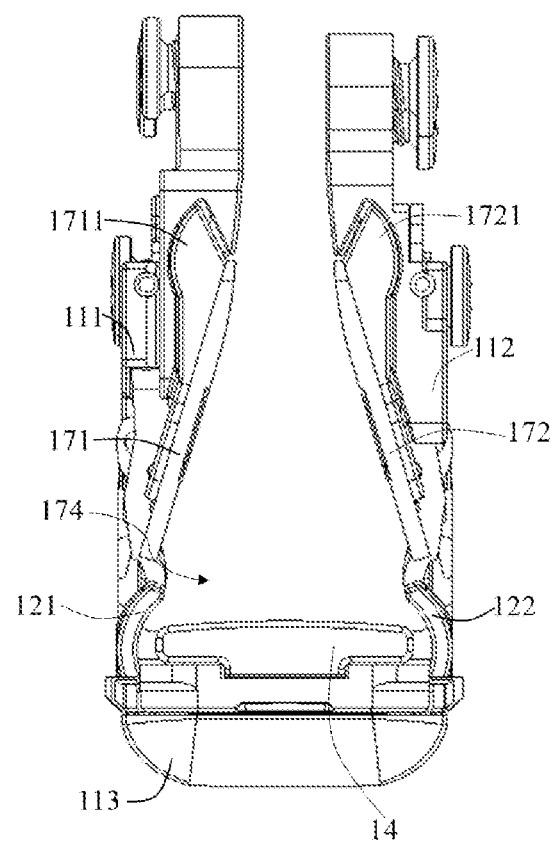
FIG. 14 is a side view of FIG. 9.
Figure 15:
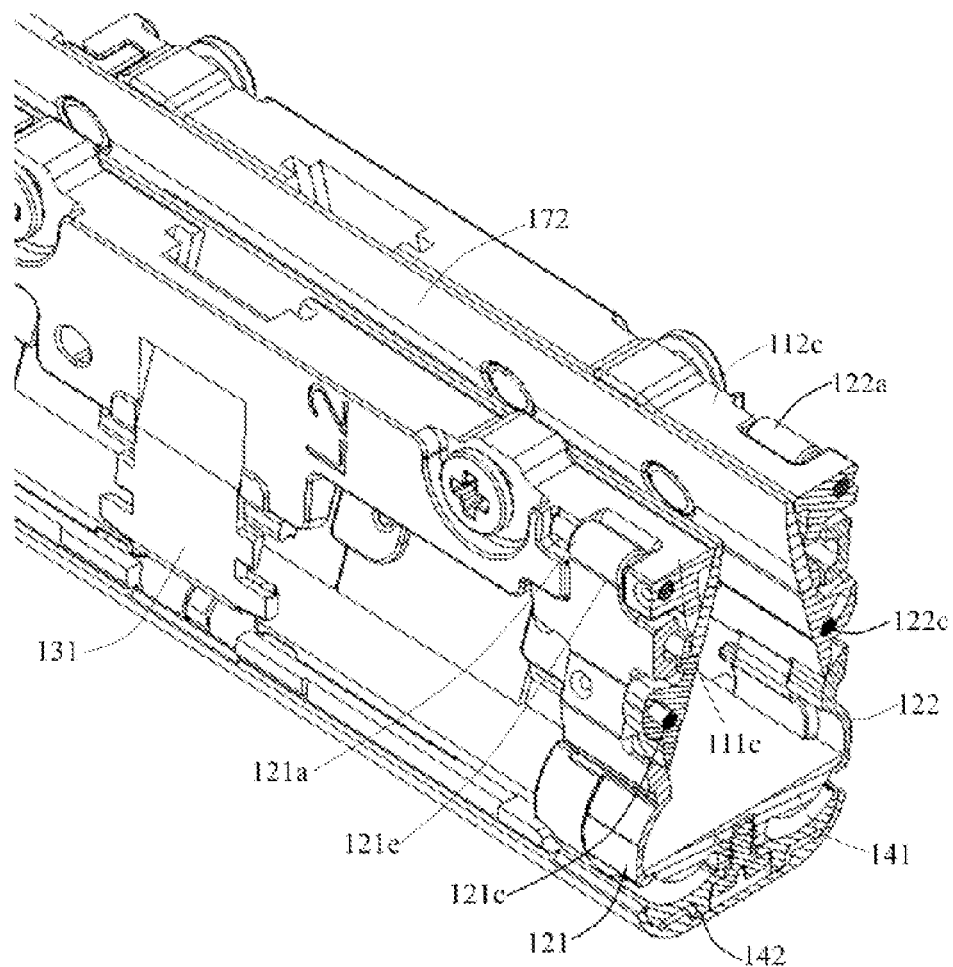
FIG. 15 is a partial sectional view of a swing arm assembly in FIG. 9.

Specifically, when the folding apparatus 1 is in the expanded state and folds, as shown in FIG. 13, external force acts on the first bracket 111 to make the first bracket 111 rotate clockwise, and drives the first connecting rod 131 and the first swing arm 121 to rotate clockwise. In this process, the included angle between the first bracket 111 and the first swing arm 121 increases, so that the connecting rod mechanism formed by the first bracket 111 and the first swing arm 121 extends, and drives the first support plate 171 to rotate and slide outward relative to the first bracket 111. A movement process of the second bracket 112, the second connecting rod 132, and the second swing arm 122 is similar to the foregoing, and details are not described herein again. After the folding apparatus 1 is folded, states shown in FIG. 14 and FIG. 15 are formed. The first support plate 171 and the second support plate 172 rotate and slide outward, so that the contour length of the accommodating space 174 can be increased, so that the folding apparatus 1 can provide sufficient space to accommodate the folded part 26 of the flexible display 2 in the folded state, to reduce pulling and squeezing of the folded part 26 in the folding process of the folding apparatus 1, and reduce a risk of a function failure of the flexible display 2.

In an expanding process of the folding apparatus 1, as shown in FIG. 13, external force acts on the first bracket 111 to make the first bracket 111 rotate counterclockwise, and drives the first connecting rod 131 and the second swing arm 121 to rotate counterclockwise. In this process, the included angle between the first bracket 111 and the first swing arm 121 is reduced, so that the connecting rod mechanism formed by the first bracket 111 and the first swing arm 121 is shortened, and the first support plate 171 is driven to rotate and slide inward relative to the first bracket 111. A movement process of the second bracket 112, the second connecting rod 132, and the second swing arm 122 is similar to the foregoing, and details are not described herein again. After the folding apparatus 1 is expanded, states shown in FIG. 14 and FIG. 15 are formed. The first support plate 171 and the second support plate 172 rotate and slide inward, so that the contour length of the accommodating space 174 can be reduced, the folding apparatus 1 can avoid pulling the flexible display 2 in the expanded state, and a risk of a function failure of the flexible display 2 is reduced.

In a specific embodiment, referring to FIG. 11 and FIG. 12, that the fifth rotating shaft 131e (a rotation center of the first connecting rod 131 relative to the principal axis 14) and the third rotating shaft 121d (a rotation center of the first swing arm 121 relative to the principal axis 14) are parallel to each other and do not overlap may be specifically that a preset distance exists between the fifth rotating shaft 131e and the third rotating shaft 121d in the height direction Z of the principal axis 14. Certainly, there may be a preset distance between the fifth rotating shaft 131e and the third rotating shaft 121d along another direction, so that the fifth rotating shaft 131e and the third rotating shaft 121d do not overlap.

Figure 16:
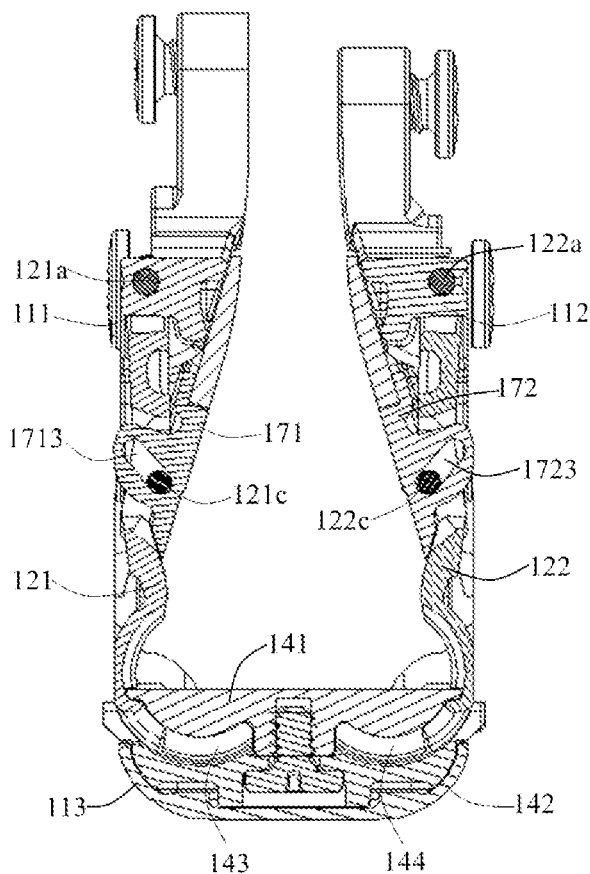
FIG. 16 is a side view of FIG. 15.
Figure 17:
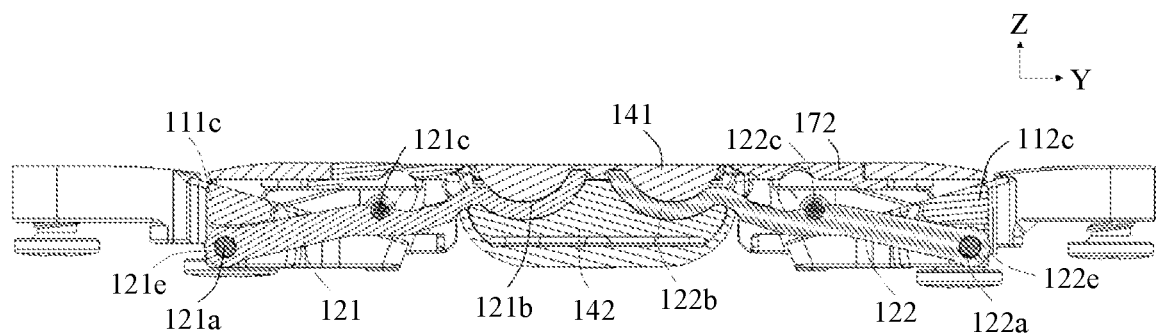
FIG. 17 is a schematic diagram of a structure of a folding apparatus in FIG. 16 in an expanded state.

As shown in FIG. 15 to FIG. 17, referring to FIG. 11 and FIG. 12, the first rotating shaft 121a is a rotation center of the first swing arm 121 rotating around the first bracket 111. In the folding process of the folding apparatus 1, the first swing arm 121 rotates around the first rotating shaft 121a. When a distance between the first rotating shaft 121a and the principal axis 14 is excessively small, a radian rotated by an end (namely, an end close to the principal axis 14) that is of the first swing arm 121 and that is away from the first rotating shaft 121a is large. In this case, an end that is of the first swing arm 121 and that is close to the principal axis 14 has a risk of interfering with the first support plate 171. When the end interferes with the first support plate 171, an avoidance hole needs to be disposed on the first support plate 171 to avoid the first swing arm 121. After the avoidance hole is disposed, structural strength of the first support plate 171 and support performance of the first support plate 171 for the flexible display 2 are reduced, and a service life of the electronic device is affected. Similarly, if a distance between the second rotating shaft 122a and the principal axis 14 is excessively small, an avoidance hole also needs to be disposed on the second support plate 172. As a result, structural strength of the second support plate 172 and support performance of the second support plate 172 for the flexible display 2 are reduced.

To solve the technical problem, a distance between the first rotating shaft 121a of the first swing arm 121 and the principal axis 14 and a distance between the second rotating shaft 122a of the second swing arm 122 and the principal axis 14 both increase, to reduce a radian rotated by an end that is of the first swing arm 121 and that is close to the principal axis 14 in the folding process of the folding apparatus, reduce a radian rotated by an end that is of the second swing arm 122 and that is close to the principal axis 14, reduce a risk of interference between the first support plate 171 and the end that is of the first swing arm 121 and that is close to the principal axis 14, and reduce a risk of interference between the second support plate 172 and the end that is of the second swing arm 122 and that is close to the principal axis 14. In this way, the avoidance hole used to avoid the first swing arm 121 does not need to be disposed on the first support plate 171, and the avoidance hole used to avoid the second swing arm 122 does not need to be disposed on the second support plate 172. This improves structural strength of the first support plate 171 and the second support plate 172 and support reliability of the first support plate 171 and the second support plate 172 for the flexible display 2.

Therefore, in this embodiment of this application, the first rotating shaft 121a is located at any position that can prevent interference between the first swing arm 121 and the first support plate 171 in the folding process of the folding apparatus 1, and the second rotating shaft 122a is located at any position that can prevent interference between the second swing arm 122 and the second support plate 172 in the folding process of the folding apparatus 1. To further prevent interference between the first swing arm 121 and the first support plate 171 and interference between the second swing arm 122 and the second support plate 172, a longer distance between the first rotating shaft 121a and the principal axis 14 is better, and a longer distance between the second rotating shaft 122a and the principal axis 14 is better.

Figure 20:
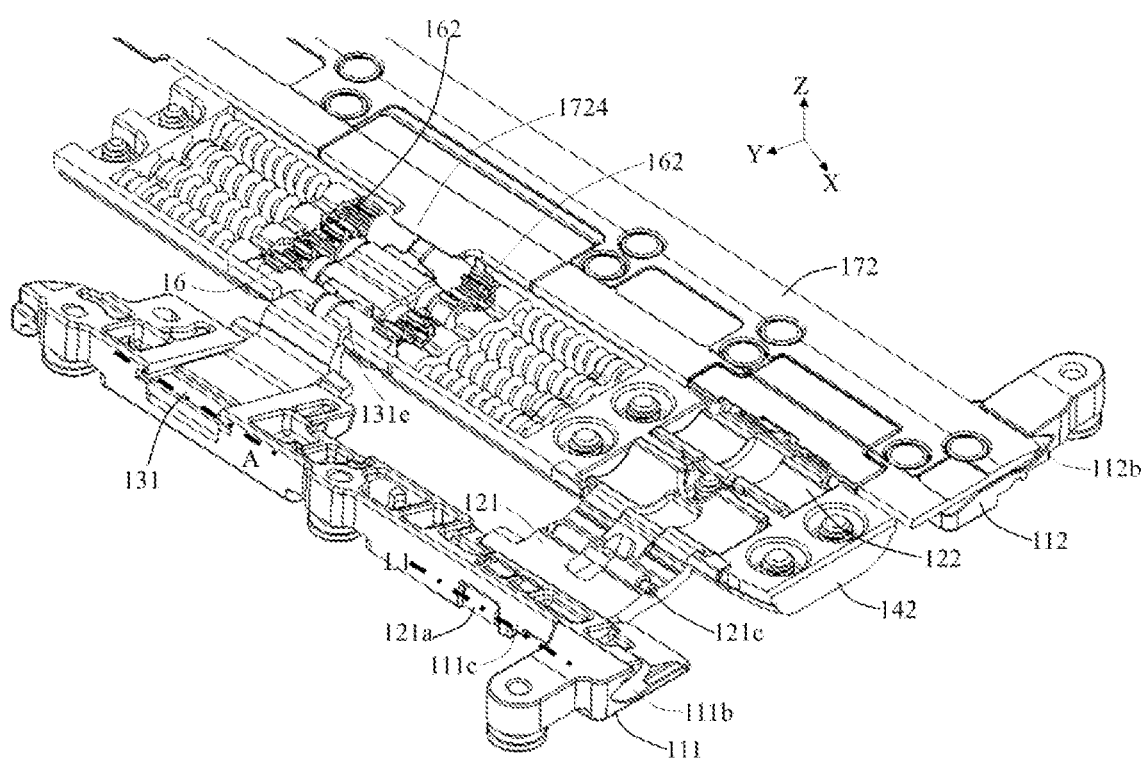
FIG. 20 is a schematic diagram of cooperation between components after a first support plate is removed in FIG. 8.

In a possible design, as shown in FIG. 20, referring to FIG. 10, the first connecting rod 131 has a first outer end part 131f away from the principal axis 14, the second connecting rod 132 has a second outer end part 132f away from the principal axis 14, and when the folding apparatus 1 is in the expanded state, the first outer end part 131f is in a first position A, and the second outer end part 132f is in a second position (not shown in the figure). The first position A is a position at which a distance between the first connecting rod 131 and the principal axis 14 is maximum in folding or expanding process of the folding apparatus 1, and the second position is a position at which a distance between the second connecting rod 132 and the principal axis 14 is maximum in folding or expanding process of the folding apparatus 1. An axis L1 on which the first rotating shaft 121a is located is located on a side that is of the first position A and that is away from the principal axis 14, and an axis L2 on which the second rotating shaft 122a is located is located on a side that is of the second position and that is away from the principal axis 14. In other words, a length of the first swing arm 121 extending in the width direction Y of the principal axis 14 is at least greater than a length of the first connecting rod 131 extending in the width direction Y of the principal axis 14, and a length of the second swing arm 122 extending in the width direction Y of the principal axis 14 is at least greater than a length of the second connecting rod 132 extending in the width direction Y of the principal axis 14.

In the embodiment shown in FIG. 20, when the first rotating shaft 121a is located on an outer side (away from the principal axis 14) of the first position A, the first bracket 111 does not stick with the first connecting rod 131 in a rotation process, and the distance between the first rotating shaft 121a and the principal axis 14 is large. In the folding process of the folding apparatus 1, the first swing arm 121 and the first support plate 171 can be prevented from being stuck. When the second rotating shaft 122a is located on an outer side (away from the principal axis 14) of the second position, the second bracket 112 does not stick with the second connecting rod 132 in a rotation process, and the distance between the second rotating shaft 122a and the principal axis 14 is large. In the folding process of the folding apparatus 1, the second swing arm 122 and the second support plate 172 can be prevented from being stuck. Therefore, in this embodiment, the positions of the first rotating shaft 121a and the second rotating shaft 122a enable the folding apparatus 1 to work normally while preventing interference between the swing arm assembly 12 and the support plate assembly, so as to avoid disposing an avoidance hole that avoids the swing arm assembly 12 on the support plate assembly, and improve support reliability of the folding apparatus 1 for the flexible display 2.

Figure 21:
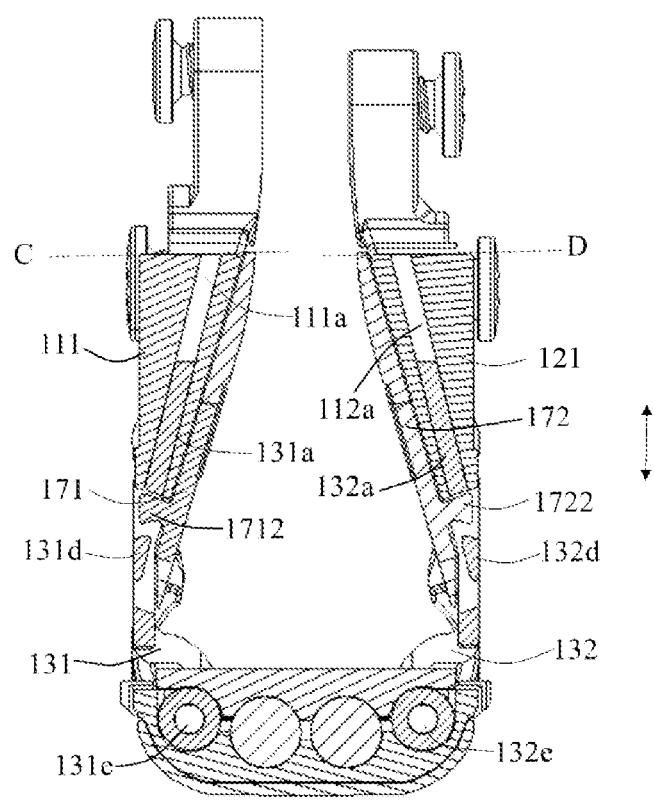
FIG. 21 is a sectional view of a folding apparatus in FIG. 9 at a connecting rod assembly.

Specifically, as shown in FIG. 21, referring to FIG. 10, in the first connecting rod 131 and the first bracket 111, one is provided with a first sliding block 131a, and the other is provided with a first track 111a, where the first sliding block 131a can slide along the first track 111a. In the second connecting rod 132 and the second bracket 112, one is provided with a second sliding block 132a, and the other is provided with a second track 112a, where the second sliding block 132a can slide along the second track 112a. The first track 111a has a third outer end part C away from the principal axis 14, and the second track 112a has a fourth outer end part D away from the principal axis 14. In this case, the axis L1 on which the first rotating shaft 121a is located is located on a side that is of the third outer end part C and that is away from the principal axis 14, and an axis on which the second rotating shaft 122a is located is located on a side that is of the fourth outer end part D and that is away from the principal axis 14.

In the embodiment shown in FIG. 21, the first track 111a is disposed on the first bracket 111, the first sliding block 131a of the first connecting rod 131 can slide along the first track 111a, the second track 112a is disposed on the second bracket 112, and the second sliding block 132a of the second connecting rod 132 can slide along the second track 112a. When a length of the first track 111a is insufficient, a sliding journey of the first sliding block 131a is affected, thereby affecting a relative sliding distance between the first connecting rod 131 and the first bracket 111. As a result, the folding apparatus 1 cannot work normally. Similarly, when a length of the second track 112a is insufficient, a relative sliding distance between the second connecting rod 132 and the second bracket 112 is affected. To solve the technical problem, usually, the length of the first track 111a is greater than or equal to the sliding journey of the first sliding block 131a, and the length of the second track 112a is greater than or equal to a sliding journey of the second sliding block 132a.

Specifically, the third outer end part C of the first track 111a is flush with the first outer end part 131f of the first connecting rod 131, or the third outer end part C is located on a side that is of the first outer end part 131f and that is away from the principal axis 14. In this case, it can be ensured that the length of the first track 111a is sufficient, and a relative motion between the first connecting rod 131 and the first bracket 111 is not limited. Similarly, the fourth outer end part D of the second track 111a is flush with the second outer end part 132f of the second connecting rod 132, or the fourth outer end part D is located on a side that is of the second outer end part 132f and that is away from the principal axis 14. In this case, it can be ensured that the length of the second track 112a is sufficient, and a relative motion between the second connecting rod 132 and the second bracket 112 is not limited.

Based on this, when an axis of the first rotating shaft 121*a* of the first swing arm 121 and the first bracket 111 is located on a side that is of the third outer end part C and that is away from the principal axis 14, the first rotating shaft 121*a* is located on the side that is of the first outer end part 131*f* of the first connecting rod 131 and that is away from the principal axis 14, and when an axis of the second rotating shaft 122*a* of the second swing arm 122 and the second bracket 112 is located on a side that is of the fourth outer end part D and that is away from the principal axis 14, the second rotating shaft 122*a* is located on the side that is of the second outer end part 132*f* of the second connecting rod 132 and that is away from the principal axis. In this case, the positions of the first rotating shaft 121*a* and the second rotating shaft 122*a* in this embodiment enable the folding apparatus 1 to work normally (prevent stuck) while preventing interference between the swing arm assembly 12 and the support plate assembly, so as to avoid disposing an avoidance hole that avoids the swing arm assembly 12 on the support plate assembly, and improve support reliability of the folding apparatus 1 for the flexible display 2.

In the embodiment shown in FIG. 21, the first track 111*a* runs through the first bracket 111, and the second track 112*a* runs through the second bracket 112.

In another specific embodiment, as shown in FIG. 20, the first bracket 111 has a fifth outer end part 111*c* away from the principal axis 14, the second bracket 112 has a sixth outer end part 112*c* away from the principal axis 14, the fifth outer end part 111*c* is a contour line of an outermost end of the first bracket 111, and the sixth outer end part 112*c* is a contour line of an outermost end of the second bracket 112. The first rotating shaft 121*a* is disposed at the fifth outer end part 111*c*, and the second rotating shaft 122*a* is disposed at the sixth outer end part 112*c*. In other words, the axis L1 of the first rotating shaft 121*a* is flush with the contour line of the fifth outer end part 111*c*, and the axis of the second rotating shaft 122*a* is flush with the contour line of the sixth outer end part 112*c*. In this case, the first outer end part 131*f* (referring to FIG. 10) of the first bracket III is flush with the fifth outer end part 111*c* of the first bracket 111. Alternatively, the fifth outer end part 111*c* is located on the side that is of the first outer end part 131*f* and that is away from the principal axis 14, and the second outer end part 132*f* (referring to FIG. 10) of the second connecting rod 132 is flush with the sixth outer end part 112*c* of the second bracket 112. Alternatively, the sixth outer end part 112*c* is located on the side that is of the second outer end part 132*f* and that is away from the principal axis 14.

In this embodiment, when the axis of the first rotating shaft 121*a* is located in the fifth outer end part 111*c* that is of the first bracket 111 and that is away from the principal axis 14, and the axis of the second rotating shaft 122*a* is located in the sixth outer end part 112*c* that is of the second bracket 112 and that is away from the principal axis 14, because the fifth outer end part 1/1*c* is a position at which a distance between the first bracket III and the principal axis 14 is maximum, and the sixth outer end part 112*c* is a position at which a distance between the second bracket 112 and the principal axis 14 is maximum, the distance between the first rotating shaft 121*a* and the principal axis 14 and the distance between the second rotating shaft 122*a* and the principal axis 14 can be increased. In this way, interference between the swing arm assembly 12 and the support plate assembly can be prevented, so as to avoid disposing the avoidance hole that avoids the swing arm assembly 12 on the support plate assembly, and improve support reliability of the folding apparatus 1 for the flexible display 2.

In addition, the first swing arm 121 has a seventh outer end part 121*e* away from the principal axis 14, and the second swing arm 122 has an eighth outer end part 122*e* away from the principal axis 14. The seventh outer end part 121*e* is a contour line of an outermost end of the first swing arm 121, and the eighth outer end part 122*e* is a contour line of an outermost end of the second swing arm 122. In addition, in this embodiment, the fifth outer end part 111*c* of the first bracket III may be located on a side that is of the seventh outer end part 121*e* of the first swing arm 121 and that is away from the principal axis 14, and the sixth outer end part 112*c* of the second bracket 112 may be located on a side that is of the eighth outer end part 122*e* of the second swing arm 122 and that is away from the principal axis 14.

In still another specific embodiment, as shown in FIG. 17, the first swing arm 121 has a seventh outer end part 121*e* away from the principal axis 14, the second swing arm 122 has an eighth outer end part 122*e* away from the principal axis 14, the seventh outer end part 121*e* is a contour line of an outermost end of the first swing arm 121, and the eighth outer end part 122*e* is a contour line of an outermost end of the second swing arm 122. The first rotating shaft 121*a* is disposed at the seventh outer end part 121*e*, and the second rotating shaft 122*a* is disposed at the eighth outer end part 122*e*. In other words, the axis L1 of the first rotating shaft 121*a* is flush with the contour line of the seventh outer end part 121*e*, and the axis of the second rotating shaft 122*a* is flush with the contour line of the eighth outer end part 122*e*. In this case, the first outer end part 131*f* (referring to FIG. 10) of the first connecting rod 131 is flush with the seventh outer end part 121*e* of the first swing arm 121. Alternatively, the seventh outer end part 121*e* is located on the side that is of the first outer end part 131*f* and that is away from the principal axis 14, and the second outer end part 132*f* (referring to FIG. 10) of the second connecting rod 132 is flush with the eighth outer end part 122*e* of the second swing arm 122. Alternatively, the eighth outer end part 122*e* is located on the side that is of the second outer end part 132*f* and that is away from the principal axis 14.

In this embodiment, when the axis of the first rotating shaft 121*a* is located in the seventh outer end part 121*e* that is of the first swing arm 121 and that is away from the principal axis 14, and an axis of the second swing arm 122 is away from the eighth outer end part 122*e* of the principal axis 14, because the seventh outer end part 121*e* is a position at which a distance between the first swing arm 121 and the principal axis 14 is maximum, and the eighth outer end part 122*e* is a position at which a distance between the second swing arm 122 and the principal axis 14 is maximum, the distance between the first rotating shaft 121*a* (a rotating shaft between the first swing arm 121 and the first bracket 111) and the principal axis 14 and the distance between the second rotating shaft 122*a* (a rotating shaft between the second swing arm 122 and the second bracket 112) and the principal axis 14 can be increased. In this way, interference between the swing arm assembly 12 and the support plate assembly can be prevented, so as to avoid disposing the avoidance hole that avoids the swing arm assembly 12 on the support plate assembly, and improve support reliability of the folding apparatus 1 for the flexible display 2.

In addition, in this embodiment, the seventh outer end part 121*e* of the first swing arm 121 may be located on a side that is of the fifth outer end part 111*c* of the first bracket 111 and that is away from the principal axis 14, and the eighth outer end part 122*e* of the second swing arm 122 may be located on a side that is of the sixth outer end part 112c of the second bracket 112 and that is away from the principal axis 14.

In a specific embodiment, as shown in FIG. 17, the fifth outer end part 111c of the first bracket 111 is rotatably connected to the seventh outer end part 121e of the first swing arm 121 through the first rotating shaft 121a, and the sixth outer end part 112c of the second bracket 112 is rotatably connected to the eighth outer end part 122e of the second swing arm 122 through the second rotating shaft 122a. In other words, an axis of the first rotating shaft 121a is located on the contour line of the fifth outer end part 111c and the contour line of the seventh outer end part 121e, and an axis of the second rotating shaft 122a is located on the contour line of the sixth outer end part 112c and the contour line of the eighth outer end part 122e. In addition, in this embodiment, the seventh outer end part 121e of the first swing arm 121 may be flush with the fifth outer end part 111c of the first bracket 111, and the eighth outer end part 122e of the second swing arm 122 may be flush with the sixth outer end part 112c of the second bracket 112. In other words, the first swing arm 121 extends to an outer end of the first bracket 111, and is rotatably connected to the first bracket 111 at an end that is of the two and that is away from the principal axis 14. The second swing arm 122 extends to an outer end part of the second bracket 112, and is rotatably connected to the second bracket 112 at an end part that is of the two and that is away from the principal axis 14. In this case, the first outer end part 131f (referring to FIG. 10) of the first connecting rod 131 is flush with the seventh outer end part 121e of the first swing arm 121 and the fifth outer end part 111c of the first bracket 111, or the seventh outer end part 121e and the fifth outer end part 111c are located on the side that is of the first outer end part 131f and that is away from the principal axis 14. The second outer end part 132f (referring to FIG. 10) of the second connecting rod 132 is flush with the eighth outer end part 122e of the second swing arm 122 and the sixth outer end part 112c of the second bracket 112, or the eighth outer end part 122e and the sixth outer end part 112c are located on a side that is of the second outer end part 132f and that is away from the principal axis 14.

In this embodiment, a position of the axis of the first rotating shaft 121a is a position at which a distance between the first swing arm 121 and the principal axis 14 and a distance between the first bracket 111 and the principal axis 14 are both maximum, and a position of the axis of the second rotating shaft 122a is a position at which a distance between the second swing arm 122 and the principal axis 14 and a distance between the second bracket 112 and the principal axis 14 are both maximum. Therefore, the distance between the first rotating shaft 121a and the principal axis 14 is large, and the distance between the second rotating shaft 122a and the principal axis 14 is large. In this way, interference between the swing arm assembly 12 and the support plate assembly can be prevented, so as to avoid disposing the avoidance hole that avoids the swing arm assembly 12 on the support plate assembly, and improve support reliability of the folding apparatus 1 for the flexible display 2.

Certainly, positions of the first rotating shaft 121a and the second rotating shaft 122a include but are not limited to the positions described in the foregoing embodiments. A position that can prevent interference between the swing arm assembly 12 and the support plate assembly falls within the protection scope of this application.

The following describes in detail a connection structure between the connecting rod assembly 13 and the principal axis and a connection structure between the connecting rod assembly 13 and the bracket assembly.

Specifically, referring to FIG. 10, the first connecting rod 131 is slidably connected to the first bracket 111 by using the first sliding block 131a and the first track 111a, and the second connecting rod 132 is slidably connected to the second bracket 112 by using the second sliding block 132a and the second track 112a. The first sliding block 131a may be disposed on the first connecting rod 131, the first track 111a may be disposed on the first bracket 111, the second sliding block 132a may be disposed on the second connecting rod 132, and the second track 112a may be disposed on the second bracket 112.

As shown in FIG. 21, the first track 111a and the second track 112a are disposed in an oblique manner, so that the first bracket 111 slides in an oblique manner relative to the first connecting rod 131, and the second bracket 112 slides in an oblique manner relative to the second connecting rod 132, to reduce a risk that the first bracket 111 is stuck with the first connecting rod 131 and the second bracket 112 is stuck with the second connecting rod 132 in the expanding or folding process of the folding apparatus 1.

In addition, cross-sectional shapes of the first sliding block 131a, the first track 111a, the second sliding block 132a, and the second track 112a may be a cross, a trapezoid, a triangle, or the like. This is not limited in this application.

In addition, as shown in FIG. 20, the principal axis 14 is provided with an axle hole (not shown in the figure), the first connecting rod 131 is connected to the fifth rotating shaft 131e, and the fifth rotating shaft 131e passes through the axle hole, so as to implement a rotating connection between the first connecting rod 131 and the principal axis 14. The fifth rotating shaft 131e may be a hinge pin or another structure. In this embodiment, a rotating connection structure between the second connecting rod 132 and the principal axis 14 may be the same as a rotating connection structure between the first connecting rod 131 and the principal axis 14, and details are not described herein again.

The following describes in detail a connection structure between the swing arm assembly 12 and the principal axis and a connection structure between the swing arm assembly 12 and the bracket assembly. One end of the first swing arm 121 is rotatably connected to the principal axis 14, the other end is rotatably connected to the first bracket 111, one end of the second swing arm 122 is rotatably connected to the principal axis 14, and the other end is rotatably connected to the second bracket 112.

In a specific embodiment, the first swing arm 121 and the principal axis 14 and the second swing arm 122 and the principal axis 14 may be connected in a virtual axis manner. A specific structure is as follows.

Figure 18:
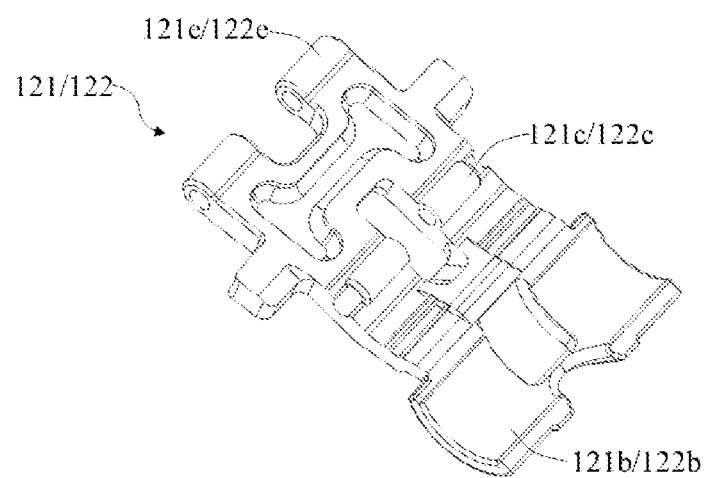
FIG. 18 is a schematic diagram of a structure of a first swing arm and a second swing arm in FIG. 17.
Figure 19:
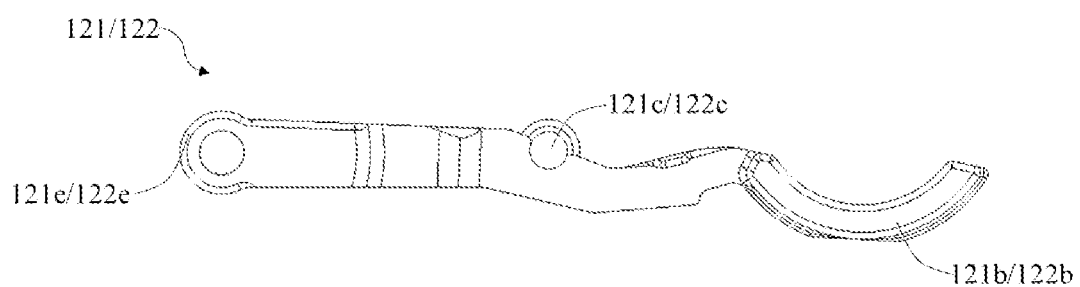
FIG. 19 is a side view of FIG. 18.

As shown in FIG. 15 and FIG. 16, a first arc groove 143 and a second arc groove 144 are respectively disposed on two sides of the principal axis 14 along the width direction Y As shown in FIG. 18 and FIG. 19, a first rotation part 121b is disposed on the first swing arm 121, and a second rotation part 122b is disposed on a second swing arm 122. The first rotation part 121b can move in the first arc groove 143, and the second rotation part 122b can move in the second arc groove 144. The first arc groove 143 and the second arc groove 144 may be a quarter arc, a one-third arc, or the like. A person skilled in the art may adaptively adjust specific parameters of the first arc groove 143 and the second arc groove 144 based on an actual requirement. This is not specifically limited in this application.

In this embodiment, relative rotation of the first swing arm 121 and the principal axis 14 is implemented through cooperation between the first rotation part 121b and the first arc groove 143. In other words, in a process in which the first rotation part 121b moves along the first arc groove 143, the first swing arm 121 rotates relative to the principal axis 14, and a rotation center of the first swing arm 121 and the principal axis 14 is a center of the first arc groove 143. In other words, the center of the first arc groove 143 is the third rotating shaft 121d. Therefore, the third rotating shaft 121d is a virtual axis. Relative rotation of the second swing arm 122 and the principal axis 14 is implemented through cooperation between the second rotation part 122b and the second arc groove 144. In other words, in a process in which the second rotation part 122b moves along the second arc groove 143, the second swing arm 122 rotates relative to the principal axis 14, and a rotation center of the second swing arm 122 and the principal axis 14 is a center of the second arc groove 144. In other words, the center of the second arc groove 144 is the fourth rotating shaft 122d. Therefore, the fourth rotating shaft 122d is a virtual axis.

As shown in FIG. 15 and FIG. 16, when the first swing arm 121 rotates relative to the second swing arm 122 (the folding apparatus 1 switches from the expanded state to the folded state), at least a part of the first rotation part 121b leaves the first arc groove 143, and at least a part of the second rotation part 122b leaves the second arc groove 144. As shown in FIG. 17, when the first swing arm 121 and the second swing arm 122 rotate back to back (the folding apparatus 1 switches from the folded state to the expanded state), at least a part of the first rotation part 121b enters the first arc groove 143, and at least a part of the second rotation part 122b enters the second arc groove 144. When the folding apparatus 1 is in a fully expanded state shown in FIG. 17, the first rotation part 121b adapts to the first arc groove 143, so that the first swing arm 121 is limited to the first position. The second rotation part 122b adapts to the second arc groove 144, so that the second swing arm 122 is limited to the first position. This improves reliability of the folding apparatus in the expanded state.

Therefore, when relative rotation between the first swing arm 121 and the principal axis 14 is implemented through cooperation between the first rotation part 121b and the first arc groove 143, and relative rotation between the second swing arm 122 and the principal axis 14 is implemented through cooperation between the second rotation part 122b and the second arc groove 144, reliability of relative rotation between the first swing arm 121 and the principal axis 14 and between the second swing arm 122 and the principal axis 14 is high, and rotation centers of the first swing arm 121 and the second swing arm 122 can be changed by changing centers of the first arc groove 143 and the second arc groove 144, so as to facilitate control of motion tracks of the first swing arm 121 and the second swing arm 122. In addition, in a virtual axis connection manner, a connection structure between the first swing arm 122 and the principal axis 14 may be hidden in the principal axis 14, to improve integration and use experience of the folding apparatus 1.

In embodiments shown in FIG. 15 to FIG. 17, the principal axis 14 may include a principal inner axis 141 and a principal outer axis 142 that are separately disposed and fastened or connected. One of the principal inner axis 141 and the principal outer axis 142 is disposed with an arc protrusion part, and the other is disposed with an arc concave part, the arc protrusion part and the arc concave part enclose the first arc groove 143 and the second arc groove 144. Alternatively, the principal axis 14 may be an integrated structure. When the principal axis 14 includes the principal inner axis 141 and the principal outer axis 142 that are disposed separately, to implement connections between the swing arm assembly 12 and the connecting rod assembly 13 and the principal axis 14.

In addition, in another specific embodiment, the first swing arm 121 and the principal axis 14 and the second swing arm 122 and the principal axis 14 may alternatively be connected in another manner, for example, a hinge pin connection.

In the foregoing embodiments, as shown in FIG. 16, the folding apparatus 1 may further include a rotating shaft cover 131, the principal axis 14 is installed in an accommodating cavity of the rotating shaft cover 131, and at least a part of the first bracket 111 and the second bracket 112 extends out of the rotating shaft cover 131.

In addition, in a specific embodiment, the first swing arm 121 and the first bracket 111, and the second swing arm 122 and the second bracket 112 may be specifically connected in a rotating manner by using a hinge pin. A specific structure is as follows.

In the embodiment shown in FIG. 15 to FIG. 17, the first swing arm 121 is rotatably connected to the first bracket 111 through the first rotating shaft 121a. In other words, a rotation center of the first swing arm 121 and the first bracket 111 is the first rotating shaft 121a. The second swing arm 122 is rotatably connected to the second bracket 112 through the second rotating shaft 122a. In other words, a rotation center of the second swing arm 122 and the second bracket 112 is the second rotating shaft 122a.

Specifically, as shown in FIG. 18 and FIG. 19, an axle hole is disposed at an end that is of the first swing arm 121 and that is away from the principal axis 14, an axle hole is also disposed on the first bracket 111, and the first rotating shaft 121a (which may be a hinge pin) penetrates through the two axle holes, so that the first bracket 111 and the first swing arm 121 can rotate relative to each other around the first rotating shaft 121a. Similarly, an axle hole is disposed at an end that is of the second swing arm 121 and that is away from the principal axis 14, an axle hole is also disposed on the second bracket 112, and the second rotating shaft 122a (which may be a hinge pin) penetrates through the two axle holes, so that the second bracket 112 and the second swing arm 122 can rotate relative to each other around the second rotating shaft 122a.

In another specific embodiment, the first bracket 111 and the first swing arm 121, and the second bracket 112 and the second swing arm 122 may alternatively be connected in another manner, for example, the foregoing virtual axis connection manner. This is not specifically limited in this application.

The following describes in detail a connection structure between the support plate assembly and the bracket assembly. In a specific embodiment, the first support plate 171 may be connected to the first bracket 111 through a virtual axis, and the second support plate 172 may also be connected to the second bracket 112 through a virtual axis.

Specifically, referring to FIG. 13, FIG. 14, and FIG. 20, a third arc groove 111b is disposed on the first bracket 111, a third rotation part 1711 is disposed on the first support plate 171, and the third rotation part 1711 can slide along the third arc groove 111b, so that the first support plate 171 rotates relative to the first bracket 111. A fourth arc groove 112b is disposed on the second bracket 112, a fourth rotation part 1721 is disposed on the second support plate 172, and the fourth rotation part 1721 can slide along the fourth arc groove 112b, so that the second support plate 172 rotates relative to the second bracket 112.

In this embodiment, when relative rotation between the first support plate 171 and the first bracket 111 is implemented through cooperation between the third rotation part 1711 and the third arc groove 111b, and relative rotation between the second support plate 172 and the second bracket 112 is implemented through cooperation between the fourth rotation part 1721 and the fourth arc groove 112b, reliability of relative rotation between the first support plate 171 and the first bracket 111 and between the second support plate 172 and the second bracket 112 is high, and the third rotation part 1711, the third arc groove 111b, the fourth rotation part 1721, and the fourth arc groove 112b can be hidden by using the virtual axis connection manner, to improve integrity of the folding apparatus 1.

In another specific embodiment, the first support plate 171 and the first bracket 111, and the second support plate 172 and the second bracket 112 may alternatively be connected in another manner, for example, a hinge pin connection.

In addition, in the folding apparatus 1, sliding connection and relative rotation between the first support plate 171 and the first connecting rod 131 or the first swing arm 121, and sliding connection and relative rotation between the second support plate 172 and the second connecting rod 132 or the second swing arm 122 are implemented by using the following structure.

Figure 22:
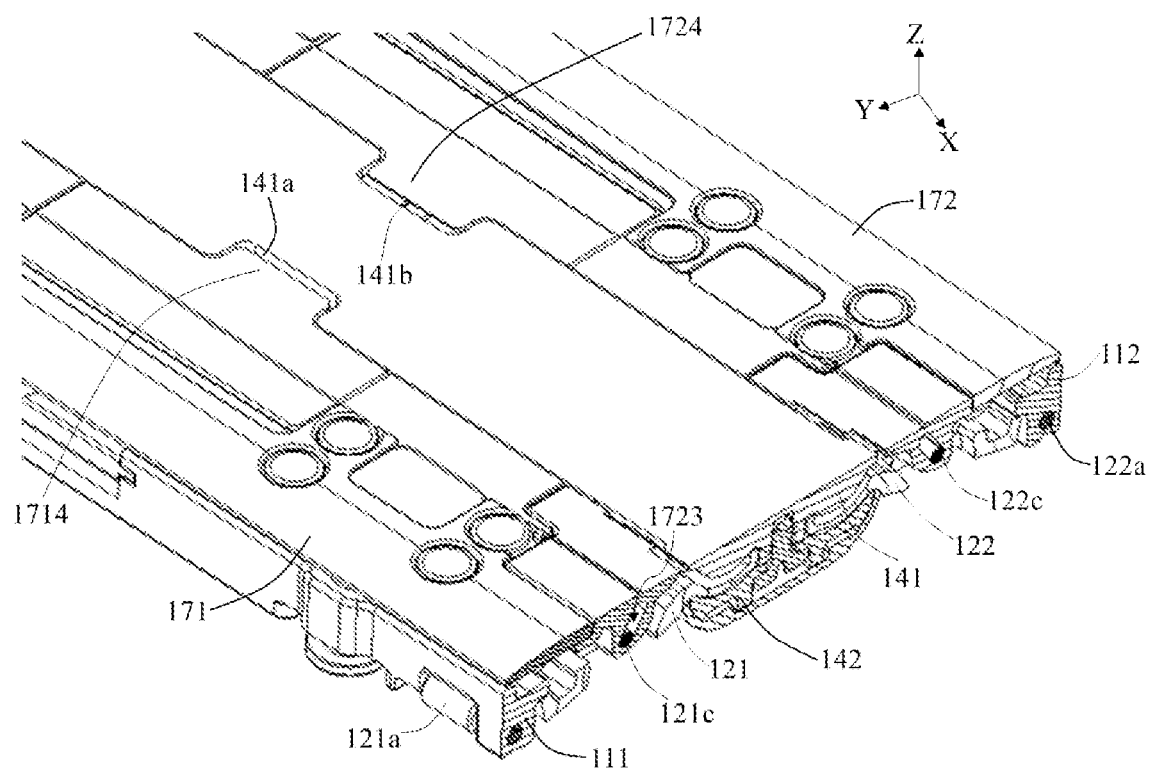
FIG. 22 is a sectional view of a folding apparatus in FIG. 20 in an expanded state.
Figure 23:
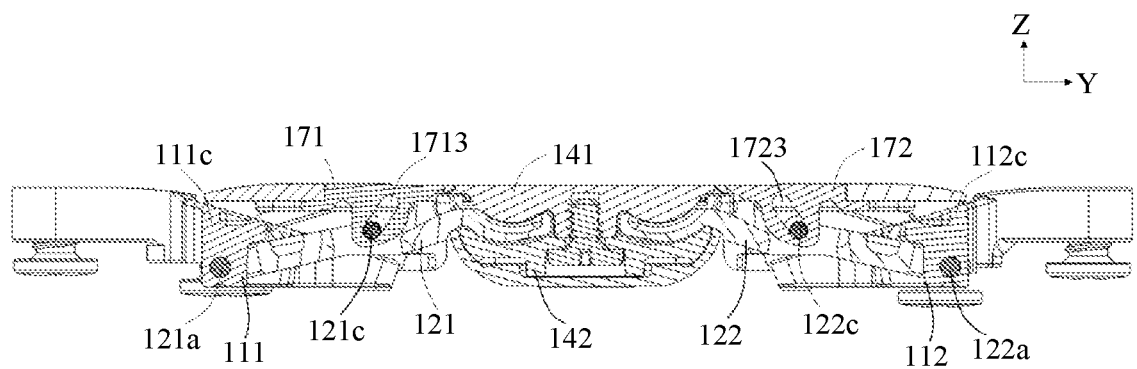
FIG. 23 is a side view of FIG. 22.

Specifically, as shown in FIG. 16, FIG. 22, and FIG. 23, a third track 1713 is disposed on the first support plate 171, a first hinge pin 121c is disposed on the first connecting rod 131 or the first swing arm 121, and the first hinge pin 121c is slidingly cooperated with the third track 1713. A fourth track 1723 is disposed on the second support plate 172, a second hinge pin 122c is disposed on the second connecting rod 132 or the second swing arm 122, and the second hinge pin 122c is slidingly cooperated with the fourth track 1723. In a process in which the first bracket 111 and the second bracket 112 rotate face to face (the first bracket 111 and the second bracket 112 rotate relative to each other in a close manner), the first hinge pin 121c slides from an end that is of the third track 1713 and that is away from the principal axis 14 to an end that is of the third track 1713 and that is close to the principal axis 14, and the second hinge pin 122c slides from an end that is of the fourth track 1723 and that is away from the principal axis 14 to an end that is of the fourth track 1723 and that is close to the principal axis 14. In addition, the third track 1713 is used to guide relative sliding between the first support plate 171 and the first connecting rod 131 or the first swing arm 121, and the fourth track 1723 is used to guide relative sliding between the second support plate 172 and the second connecting rod 132 or the second swing arm 122.

Certainly, the third track may alternatively be disposed on the first connecting rod or the first swing arm, the first hinge pin may alternatively be disposed on the first support plate, the fourth track may alternatively be disposed on the second connecting rod or the second swing arm, and the second hinge pin may alternatively be disposed on the second support plate. Positions for disposing the track and the hinge pin are not limited in this application.

In addition, along the length direction X of the principal axis 14, a plurality of third tracks 1713 may be disposed on the first support plate 171. Correspondingly, a plurality of first hinge pins 121c may be disposed on the first connecting rod 131 or the first swing arm 121. The first hinge pins 121c correspondingly cooperate with the third tracks 1713, so that reliability of a sliding connection between the first support plate 171 and the first connecting rod 131 or the first swing arm 121 can be improved. Along the length direction X of the principal axis 14, a plurality of fourth tracks 1723 may be disposed on the second support plate 172, a plurality of second hinge pins 122c may be disposed on the second connecting rod 132 or the second swing arm 122, and the second hinge pins 122c correspondingly cooperate with the fourth tracks 1723, so that reliability of a sliding connection between the second support plate 172 and the second connecting rod 132 or the second swing arm 122 can be improved.

In a specific embodiment, as shown in FIG. 16, FIG. 22, and FIG. 23, the third track 1713 has a first end and a second end that are oppositely disposed, and the fourth track 1723 has a third end and a fourth end that are oppositely disposed. The second end is closer to the principal axis 14 compared with the first end, and the fourth end is closer to the principal axis 14 compared with the third end. When the folding apparatus 1 is in the expanded state shown in FIG. 23 and FIG. 24, the first hinge pin 121c cooperates with the third track 1713 at the first end, and the second hinge pin 122c cooperates with the fourth track 1723 at the third end. When the folding apparatus 1 is in the folded state shown in FIG. 17, the first hinge pin 121c cooperates with the third track 1713 at the second end, and the second hinge pin 122c cooperates with the fourth track 1723 at the fourth end.

In a process in which the folding apparatus 1 switches from the expanded state shown in FIG. 22 and FIG. 23 to the folded state shown in FIG. 16, that is, in a process in which the first bracket 111 and the second bracket 112 rotate face to face (in other words, the first bracket 111 and the second bracket 112 rotate relative to each other in a close manner), the first hinge pin 121c slides from the first end of the third track 1713 to the second end of the third track 1713, and the second hinge pin 122c slides from the third end of the fourth track 1723 to the fourth end of the fourth track 1723. Because the second end is closer to the principal axis 14 than the first end, in this process, the first support plate 171 can slide in a direction away from the principal axis 14 relative to the first connecting rod 131 or the first swing arm 121. A movement process of the second support plate 172 is similar to that of the first support plate 171, and details are not described herein again. This increases the contour length of the accommodating space 174. In a process in which the folding apparatus 1 switches from the folded state shown in FIG. 16 to the expanded state shown in FIG. 22 and FIG. 23, that is, in a process in which the first bracket 111 and the second bracket 112 rotate back to back, the first hinge pin 121c slides from the second end of the third track 1713 to the first end of the third track 1713, and the second hinge pin 122c slides from the fourth end of the fourth track 1723 to the third end of the fourth track 1723. Because the fourth end is closer to the principal axis 14 than the third end, in this process, the first support plate 171 can slide in a direction close to the principal axis 14 relative to the first connecting rod 131 or the first swing arm 121. A movement process of the second support plate 172 is similar to that of the first support plate 171, and details are not described herein again. This reduces the contour length of the accommodating space 174.

Specifically, in embodiments shown in FIG. 16, FIG. 22, and FIG. 23, the third track 1713 is an arc structure or an oblique structure, and the fourth track 1723 is an arc structure or an oblique structure. In this case, the third track 1713 enables the first support plate 171 to rotate relative to the first connecting rod 131 or the first swing arm 121 while sliding relative to the first connecting rod 131 or the first swing arm 121, so as to prevent the first support plate 171 and the first connecting rod 131 or the first swing arm 121 from being stuck. The fourth track 1723 enables the second support plate 172 to rotate relative to the second connecting rod 132 or the second swing arm 122 while sliding relative to the second connecting rod 132 or the second swing arm 122, to prevent the second support plate 172 the second connecting rod 132 or the second swing arm 122 from being stuck.

In addition, the first hinge pin 121*c* may be disposed on the first connecting rod 131 or the first swing arm 121, and the second hinge pin 122*c* may be disposed on the second connecting rod 132 or the second swing arm 122. In embodiments shown in FIG. 16, FIG. 22, and FIG. 23, the first hinge pin 121*c* is disposed on the first swing arm 121, and the second hinge pin 122*c* is disposed on the second swing arm 122. The first swing arm 121 and the second swing arm 122 can rotate relative to the principal axis 14, and can also slide relative to the principal axis 14 (the first rotation part 121*b* moves along the first arc groove 143, and the second rotation part 122*b* moves along the second arc groove 144). Therefore, when the first hinge pin 121*c* is disposed on the first swing arm 121, and the second hinge pin 122*c* is disposed on the second swing arm 122, sizes of the third track 1713 and the fourth track 1723 can be reduced.

Figure 24:
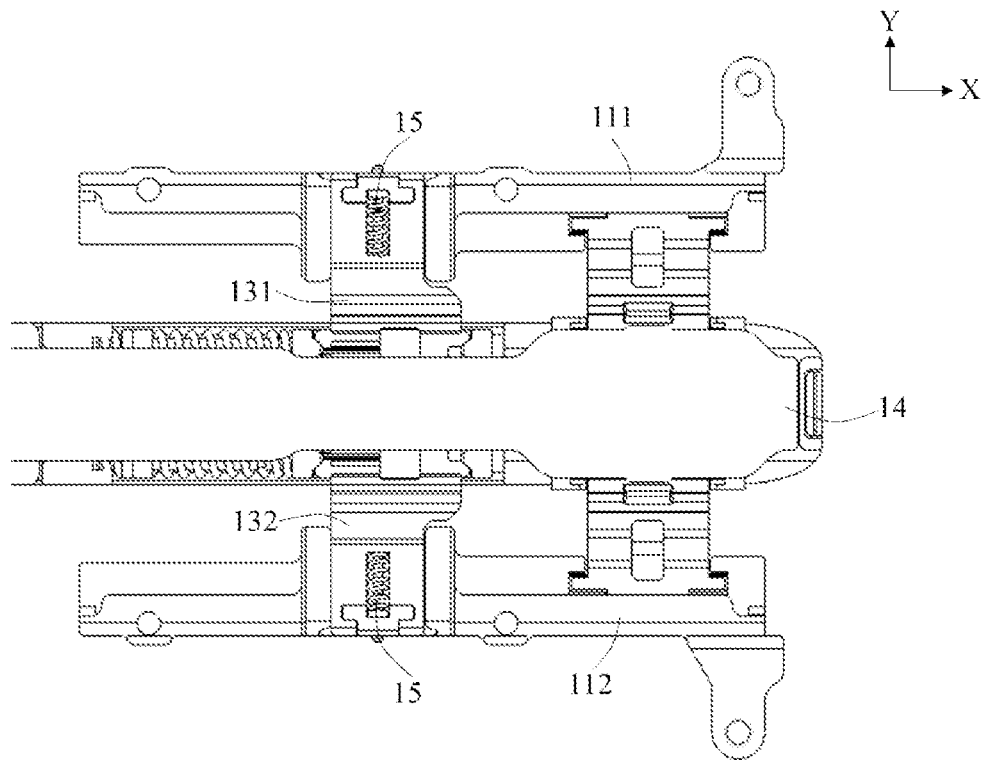
FIG. 24 is a schematic diagram of a partial structure of FIG. 7.
Figure 25:
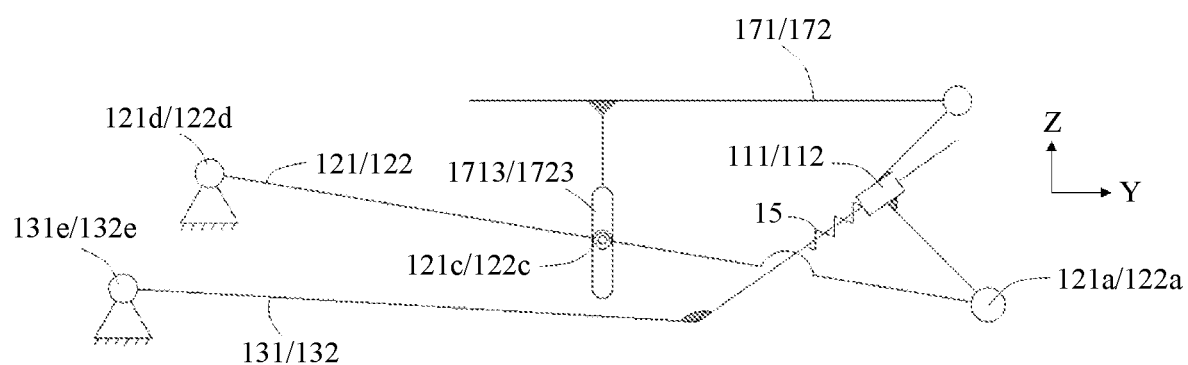
FIG. 25 is a principle diagram of FIG. 24.

In a specific embodiment, as shown in FIG. 24 and FIG. 25, the folding apparatus 1 further includes a tension assembly 15. The tension assembly 15 is disposed between the connecting rod assembly 13 and the support plate assembly. When the folding apparatus 1 is in the expanded state, the tension assembly 15 can provide tension force, to push the first bracket 111 and the second bracket 112 to be away from each other, so that the folding apparatus 1 remains in the expanded state, and the flexible display 2 is flattened. In other words, a crease of the flexible display 2 is flattened. This further reduces a crease of the electronic device. The following specifically describes a specific structure of the tension assembly 15.

Figure 26:
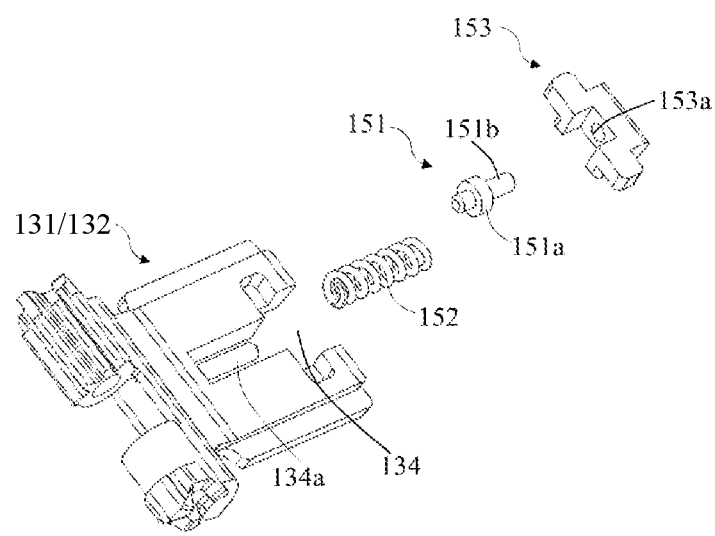
FIG. 26 is an exploded view of a tension assembly in FIG. 24.
Figure 27:
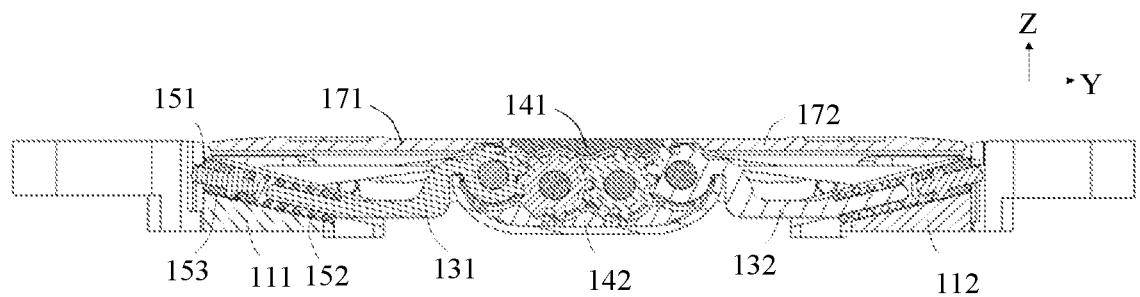
FIG. 27 is a sectional view of FIG. 24, where a folding apparatus is in an expanded state.
Figure 28:
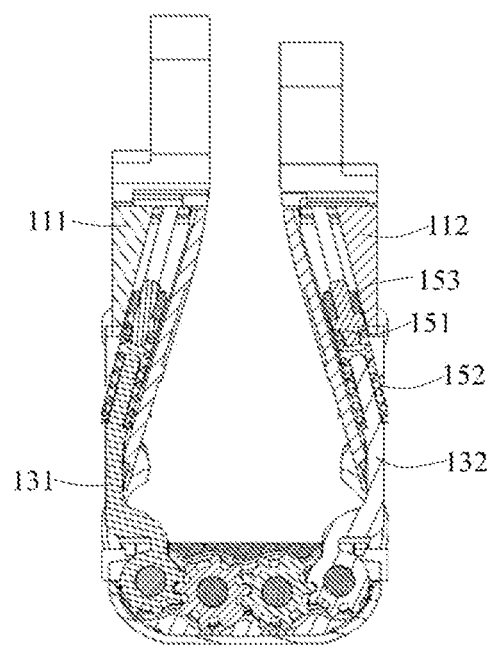
FIG. 28 is a sectional view of a folding apparatus in FIG. 27 in a folded state.

Specifically, as shown in FIG. 26 to FIG. 28, the tension assembly 15 includes two tension groups, one tension group is disposed between the first connecting rod 131 and the first bracket 111, one tension group is also disposed between the second connecting rod 132 and the second bracket 112, and each tension group includes a pushing piece 151 and a driving piece 152. The driving piece 152 of each tension group is connected to the connecting rod assembly 13. When the folding apparatus 1 is in the expanded state shown in FIG. 27, the driving piece 15 of each tension group can apply first push force to the pushing piece 151 in the tension group, to push the pushing piece 151 in the tension group to move in a direction away from the principal axis 14. Specifically, a driving piece 152 in the tension group disposed between the first connecting rod 131 and the first bracket 111 is connected to the first connecting rod 131, and a driving piece 152 in the tension group disposed between the second connecting rod 132 and the second bracket 112 is connected to the second connecting rod 131. When the folding apparatus 1 is in the folded state, the pushing pieces 151 in the two tension groups respectively push the first bracket 111 and the second bracket 112 to be away from each other.

In a specific embodiment, as shown in FIG. 26 to FIG. 28, the driving piece 152 in each tension group is an elastic piece, one end of the driving piece 152 in each tension group is connected to the first connecting rod 131 and the second connecting rod 132, and the other end is connected to the pushing piece 151 in the tension group. Specifically, the first connecting rod 131 or the second connecting rod 132 has a mounting cavity 134, a mounting column 134*a* is disposed in the mounting cavity 134, the pushing piece 151 in each tension group has a convex plate 151*a*, one end of the driving piece 152 in each tension group can be sleeved on the mounting column 134*a*, and the other end presses against the convex plate 151*a* of the pushing piece 151 in the tension group.

When the folding apparatus 1 is in the expanded state shown in FIG. 27, the driving piece 152 (elastic piece) in each tension group is in a compressed state. In other words, the driving piece 152 has elastic force outward (away from the principal axis 14) along the width direction Y of the principal axis 14. The elastic force acts on the connecting rod assembly 13 and the bracket assembly, so as to drive the bracket assembly to have an outward (away from the principal axis 14) movement trend along the width direction Y of the principal axis 14. This promotes the folding apparatus 1 to be flattened. In the folding process of the folding apparatus 1, because the bracket assembly slides outward (away from the principal axis 14) relative to the connecting rod assembly 13, a compression amount of the driving piece 152 in each tension group can be driven to decrease or restore an initial state or extend, to reduce push force of the pushing piece 151 in the tension group on the bracket assembly or release push force of the pushing piece 151 in the tension group on the bracket assembly. When the folding apparatus 1 is in the folded state shown in FIG. 28, each part of the tension assembly 15 is retracted to an inner cavity of the bracket assembly and the connecting rod assembly 13. In other words, the tension assembly 15 does not occupy external space of the folding apparatus 151. This improves appearance integrity of the folding apparatus 1.

Certainly, the driving piece 152 in each tension group may be implemented by using another structure, for example, a magnetic piece or an elastomer. Specifically, the pushing piece 151 in each tension group is connected to a first magnetic piece, the bracket assembly is connected to a second magnetic piece, and a first magnetic piece and a corresponding second magnetic piece in each tension group are mutually exclusive. When the folding apparatus 1 is in the expanded state, the first magnetic piece and the corresponding second magnetic piece in each tension assembly are close to each other and mutually exclusive, so as to promote the folding apparatus 1 to be flattened. When the folding apparatus 1 is in the folded state, the first magnetic piece and the corresponding second magnetic piece in each tension assembly are away from each other, and exclusive force between the first magnetic piece and the corresponding second magnetic piece is reduced. Therefore, a specific structure of the driving piece 152 in each tension group is not limited in this application.

More specifically, as shown in FIG. 26 to FIG. 28, each tension group further includes a guiding piece 153, a guiding hole 153*a* is disposed on the guiding piece 153, the pushing piece 151 in each tension group includes a sliding part 151*b*, and the sliding part 151*b* in each tension group is slidingly cooperated with the guiding hole 153*a*.

In this embodiment, in each tension group, the guiding piece 153 and the driving piece 152 are located at two ends of the pushing piece 151. In other words, the guiding piece 153 in each tension group is located at an end close to the bracket assembly. When the sliding part 151*b* of the pushing piece 151 in each tension group is slidingly cooperated with the guiding hole 153*a* of the guiding piece 153 in the tension group, a moving journey of the pushing piece 151 can be limited by using the guiding piece 153 in the tension group. This prevents excessively large push force on the bracket assembly when a movement journey of the pushing piece 151 in each tension group is excessively large, to improve reliability of the bracket assembly. In addition, the guiding piece 153 in the tension group can further guide a movement of the pushing piece 151 in the tension group, to prevent the pushing piece 151 from being deviated.

Figure 29:
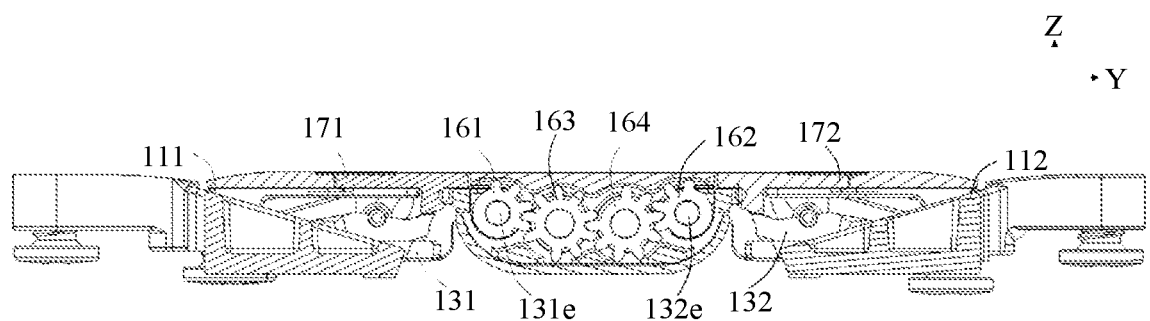
FIG. 29 is a sectional view of a folding apparatus in FIG. 7 at a synchronization gear group.

In the foregoing embodiments, as shown in FIG. 29, the folding apparatus 1 may further include a synchronization gear group. The synchronization gear group is used to transfer a motion between the first connecting rod 131 and the second connecting rod 132, so that the first connecting rod 131 and the second connecting rod 132 move synchronously in the folding and expanding processes, and the first bracket 111 and the second bracket 112 move synchronously, to improve stability and reliability of the folding apparatus 1 and the electronic device in the folding and expanding processes.

Specifically, as shown in FIG. 29, the synchronization gear group includes a first gear 161 and a second gear 162 that are engaged with each other. The first gear 161 is connected to the first connecting rod 131 through the fifth rotating shaft 131e. In a process of rotating the first gear 161, the first connecting rod 131 can rotate around the fifth rotating shaft 131e. Similarly, as shown in FIG. 29, the second gear 162 is connected to the second connecting rod 132 through the sixth rotating shaft 132e. In a process of rotating the second gear 162, the second connecting rod 132 can rotate around the sixth rotating shaft 132e.

In this embodiment, the first gear 161 and the first connecting rod 131 rotate around a same rotating shaft (the fifth rotating shaft 131e), and the second gear 162 and the second connecting rod 132 rotate around a same rotating shaft (the sixth rotating shaft 132e), so that the first gear 161 and the first connecting rod 131 rotate synchronously, and the second gear 162 and the second connecting rod 132 rotate synchronously. The first connecting rod 131 is connected to the first bracket 111, and the second connecting rod 132 is connected to the second bracket 112. In this way, the first bracket 111 and the second bracket 112 rotate synchronously.

As shown in FIG. 29, the synchronization gear group may further include a third gear 163 and a fourth gear 164. The third gear 163 is engaged with the first gear 161, the fourth gear 164 is engaged with the second gear 162, the third gear 163 is engaged with the fourth gear 164, and the first gear 161, the third gear 163, the fourth gear 164, and the second gear 162 are arranged along the width direction Y of the principal axis 14. In this embodiment, the third gear 163 and the fourth gear 164 that are engaged with the first gear 161 and the second gear 162 are additionally disposed, so that diameters of the first gear 161 and the second gear 162 can be reduced while the first gear 161 and the second gear 162 are engaged with each other. This reduces space occupied by the synchronization gear group along the width direction Y and the thickness direction Z of the principal axis 14, and facilitates miniaturization and thinning of the folding apparatus 1.

Certainly, the foregoing synchronization gear group does not need to be implemented by using four mutually engaged gears, and may be of another structure, for example, may be implemented by using two mutually engaged gears or more than four mutually engaged gears. A specific structure of the synchronization gear group is not limited in this application.

Figure 30:
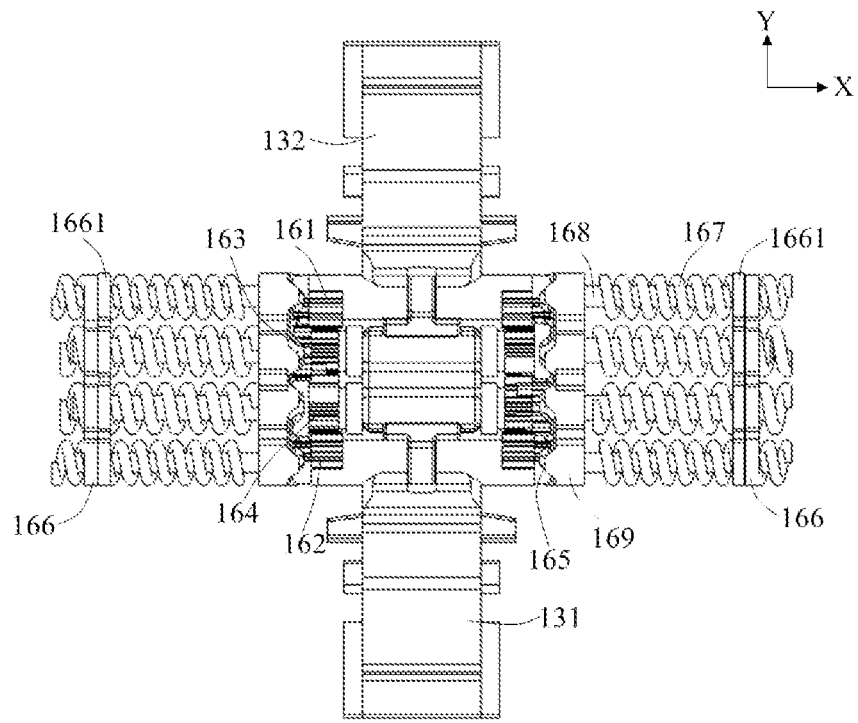
FIG. 30 is a schematic diagram of a structure of a synchronization damping assembly in FIG. 20.
Figure 31:
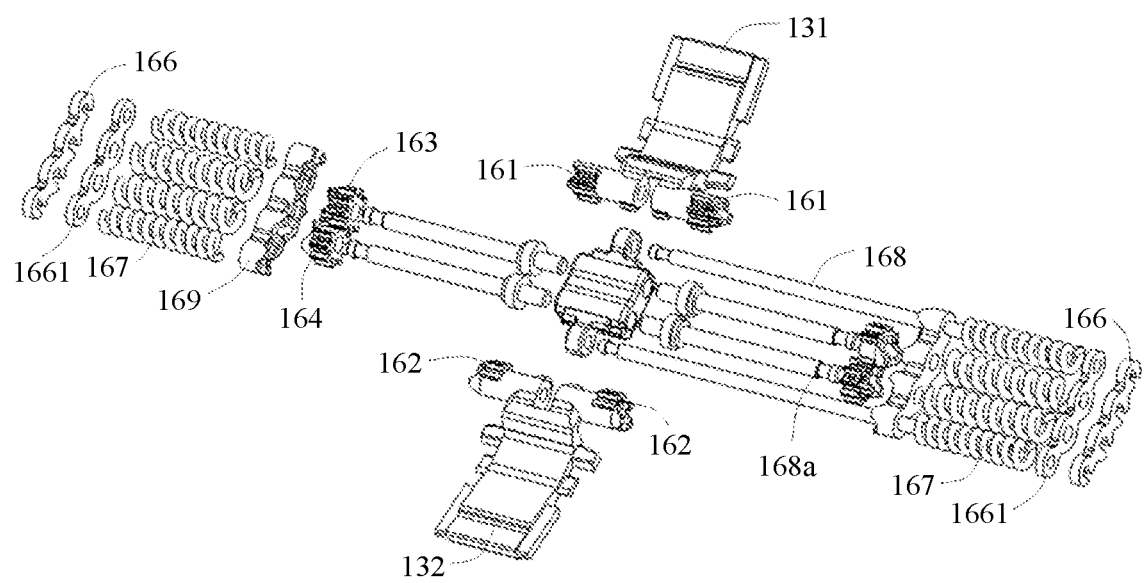
FIG. 31 is an exploded view of FIG. 30.

In a specific embodiment, as shown in FIG. 30 and FIG. 31, the folding apparatus 1 further includes a synchronization damping assembly 16. The synchronization damping assembly 16 is connected to the first bracket 111 and the second bracket 112 (including direct connection or indirect connection). When the folding apparatus 1 is in the expanded state, the synchronization damping assembly 16 can provide first damping force, and the first synchronization damping force can act on the first bracket 111 and the second bracket 112. Therefore, resistance of the first bracket 111 and the second bracket 112 to rotate face to face (the first bracket 111 and the second bracket 112 rotate relative to each other in a close manner) is provided, so that the folding apparatus 1 can be maintained in the expanded state. In addition, when the folding apparatus 1 needs to be switched from the expanded state to the folded state, the user needs to apply driving force that can overcome the first damping force to the first bracket 111 and the second bracket 112, so that the first bracket 111 and the second bracket 112 can overcome the first damping force. In this way, the folding apparatus 1 is switched to the folded state. When the folding apparatus 1 is in the folded state, the first damping component 191 can provide second damping force, and the second damping force can act on the first bracket 111 and the second bracket 112, to provide resistance for the first bracket 111 and the second bracket 112 to rotate back to back, so that the folding apparatus 1 can maintain the folded state. In addition, when the folding apparatus 1 needs to be switched from the folded state to the expanded state, the user needs to apply driving force that can overcome the second damping force to the first bracket 111 and the second bracket 112. In this way, the first bracket 111 and the second bracket 112 can overcome the second damping force, so that the folding apparatus 1 is switched to the expanded state. In addition, in a process in which the folding apparatus 1 is folded or expanded, in which the first bracket 111 and the second bracket 112 rotate face to face (the first bracket 111 and the second bracket 112 rotate relative to each other in a close manner) or rotate back to back (the first bracket 111 and the second bracket 112 are away from each other), the first damping component 191 can further provide third damping force, to provide torque for the electronic device in the expanding and folding processes, and improve user experience in the expanding and folding processes. The first damping force and the second damping force may be the same or different, and the third damping force may be less than the first damping force and the second damping force.

The folding apparatus 1 may include a plurality of synchronization damping assemblies 16, and the synchronization damping assemblies 16 are arranged at intervals along the length direction X of the principal axis 14.

The following describes a specific structure of the synchronization damping assembly 16.

Figure 32:
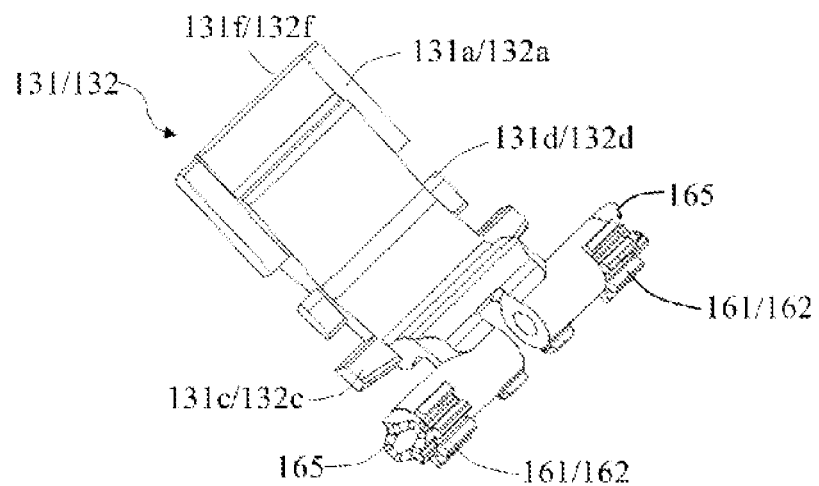
FIG. 32 is a schematic diagram of a structure of a first connecting rod or a second connecting rod in 20 in a specific embodiment.

As shown in FIG. 30 and FIG. 31, the synchronization damping assembly 16 includes the foregoing synchronization gear group and a cam 169, and the cam 169 and the first gear 161 and the second gear 162 of the synchronization gear group are distributed along the length direction X of the principal axis 14. The cam 169 may be disposed on two sides of the first gear 161 and the second gear 162 along the length direction X of the principal axis 14, and the cam 169 and the synchronization gear group are oppositely disposed along the length direction X of the principal axis 14. As shown in FIG. 32, a first concave convex surface is disposed at an end part that is of the cam 169 and that faces the synchronization gear group along the length direction X of the principal axis 14. Correspondingly, a second concave convex surface 165 is disposed at an end that is of the synchronization gear group and that is opposite to the cam 169, and the first concave convex surface can be engaged with the second concave convex surface 165.

In addition, as shown in FIG. 30 and FIG. 31, the synchronization damping assembly 16 may further include a first elastic piece 167. An elastic deformation direction of the first elastic piece 167 is parallel to the length direction X of the principal axis 14, and the first elastic piece 167 is located on a side that is of the cam 169 and that is away from the synchronization gear group, and one end of the first elastic piece 167 is connected to the cam 169 along the length direction Y of the principal axis 14, and the other end is connected to the principal axis 14. In other words, when the first elastic piece 167 is elastically deformed, elastic force can be applied to the cam 169 along the length direction X of the principal axis 14. When there are cams 169 on two sides of the synchronization gear group along the length direction X of the principal axis 14, the synchronization damping assembly 16 includes two groups of first elastic pieces 167, and the two groups of first elastic pieces 167 respectively cooperate with two groups of cams 169. The first elastic piece 167 is in a compressed state.

It may be understood that a process in which the first concave convex surface of the cam 169 is engaged with the second concave convex surface 165 of the synchronization gear group includes at least the following three cases: In a first case, a convex surface of the first concave convex surface fits a convex surface of the second concave convex surface 165. In this case, the cam 169 moves toward a direction of the corresponding first elastic piece 167, and compresses the first elastic piece 167, so that the first elastic piece 167 has a first deformation amount. In this case, the first elastic piece 167 in the compressed state can apply first elastic force to the synchronization gear group by using the cam 169. In a second case, a convex surface of the first concave convex surface fits a concave surface of the second concave convex surface 165, or a concave surface of the first concave convex surface fits a convex surface of the second concave convex surface 165. In this case, the first elastic piece 167 in the compressed state can apply second elastic force to the synchronization gear group by using the cam 169. The first elastic piece 167 has a second deformation amount, the second deformation amount is less than the first deformation amount, and the second elastic force is less than the first elastic force. In a third case, a concave surface of the first concave convex surface fits a concave surface of the second concave convex surface 165. In this case, the first elastic piece 167 in the compressed state can apply third elastic force to the synchronization gear group by using the cam 169. The first elastic piece 167 has a third deformation amount, the third deformation amount is less than the first deformation amount and less than the second deformation amount, and the third elastic force is less than the first elastic force and less than the second elastic force.

In this embodiment, a magnitude of damping force applied by the synchronization damping assembly 16 is determined by a magnitude of elastic force of the first elastic piece 167. In addition, when the first bracket 111 and the second bracket 112 drive the first connecting rod 131 and the second connecting rod 132 to rotate, the synchronization gear group can rotate accordingly, so that a fitting position of the first concave convex surface and the second concave convex surface 165 changes, and the fitting position of the first concave convex surface and the second concave convex surface 165 is switched in the foregoing three cases.

In a first specific embodiment, when the folding apparatus 1 is in the folded state or the expanded state, the first case may be implement. In this case, when the folding apparatus 1 needs to switch between the folded state and the expanded state, the applied external force needs to overcome the first elastic force of the first elastic piece 167. In addition, in a process in which the folding apparatus 1 switches between the folded state and the expanded state, the second case or the third case may be implemented. In other words, in the folding or expanding process, the synchronization damping assembly 16 can provide damping force of a same magnitude as the second elastic force or the third elastic force. In a second specific embodiment, when the folding apparatus 1 is in the folded state or the expanded state, the second case may be implemented. In this case, when the folding apparatus 1 needs to switch between the folded state and the expanded state, the applied external force needs to overcome the second elastic force of the first elastic piece 167. In addition, in a process in which the folding apparatus 1 switches between the folded state and the expanded state, the third case may be implemented. In other words, in the folding or expanding process, the synchronization damping assembly 16 can provide damping force of a same magnitude as the third elastic force.

In addition, in the foregoing process in which the first concave convex surface is engaged with the second concave convex surface 165, slopes of the first concave convex surface and the second concave convex surface 165 cooperate with each other. In other words, interaction force between the first concave convex surface and the second concave convex surface 165 is perpendicular to the slope (concave surface or convex surface) of the first concave convex surface and the second concave convex surface 165. The interaction force acting on the slopes (concave surface or convex surface) can generate partial force that drives the synchronization gear group to rotate. In this way, driving force that drives the first connecting rod 131 and the second connecting rod 132 to rotate face to face (the first connecting rod 131 and the second connecting rod 132 rotate relative to each other in a close manner) or to rotate back to back (the first connecting rod 131 and the second connecting rod 132 are away from each other) is generated, so that the folding apparatus 1 can be automatically folded or expanded.

The synchronization damping assembly 16 may include a plurality of cams 169, and a quantity of the cams 169 may be the same as a quantity of synchronization gear groups, so that each synchronization gear group can be subject to damping force.

In addition, as shown in FIG. 30 and FIG. 31, the synchronization damping assembly 16 further includes a clamping piece 166 and a plurality of third hinge pins 168 extending along the length direction X of the principal axis 14. The third hinge pin 168 passes through the synchronization gear group, so that the synchronization gear group can rotate around the third hinge pin 168, and the cam 169 and the first elastic piece 167 are sleeved on the third hinge pin 168. In addition, a clamping slot 168a is disposed at an end that is of the third hinge pin 168 and that is away from the synchronization gear group, and the clamping slot 168a is used to be clamped to the clamping piece 166, so that each component of the synchronization damping assembly 16 is clamped by using the clamping piece 166, and the first elastic piece 167 is in a compressed state. The clamping piece 166 is connected to a gasket 1661, and the gasket 1661 is configured to slow down impact force between the clamping piece 166 and the third hinge pin 168.

In a specific embodiment, as shown in FIG. 8, the principal axis 14 includes the principal inner axis 141 and the principal outer axis 142, and the principal inner axis 141 and the principal outer axis 142 are connected to enclose an accommodating cavity. The synchronization gear group is located in the accommodating cavity. The first gear 161 and the second gear 162 of the synchronization gear group are respectively connected to the first connecting rod 131 and the second connecting rod 132. Usually, the first gear 161 is disposed in the middle of the first connecting rod 131 along the length direction X of the principal axis 14. The second gear 162 is disposed in the middle of the second connecting rod 132 along the length direction X of the principal axis 14. To prevent the principal inner axis 141 from interfering with the first gear 161 and the second gear 162, a first notch 141a and a second notch 141b need to be disposed at two ends of the principal inner axis 141 along the width direction Y of the principal axis 14. The first notch 141a is used to avoid the first gear 161 of the first connecting rod 131, and the second notch 141b is used to avoid the second gear 162 of the second connecting rod 132. Therefore, there are openings (namely, the first notch 141a and the second notch 141b) at positions of the first gear 161 and the second gear 162 on a support surface that is formed by the folding apparatus 1 and that is used to support the flexible display 2, and consequently, support reliability for the flexible display 2 is low.

Figure 33:
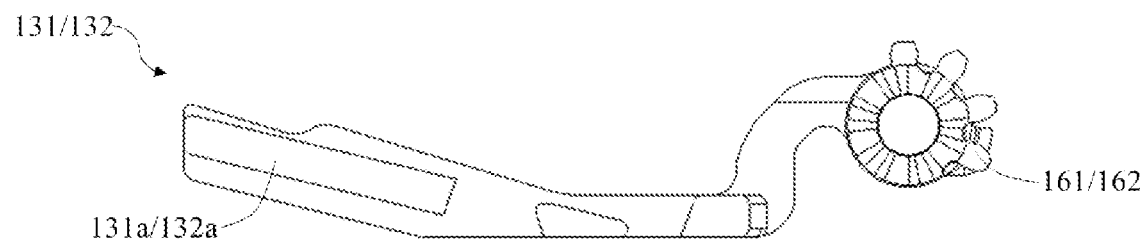
FIG. 33 is a side view of FIG. 32.
Figure 34:
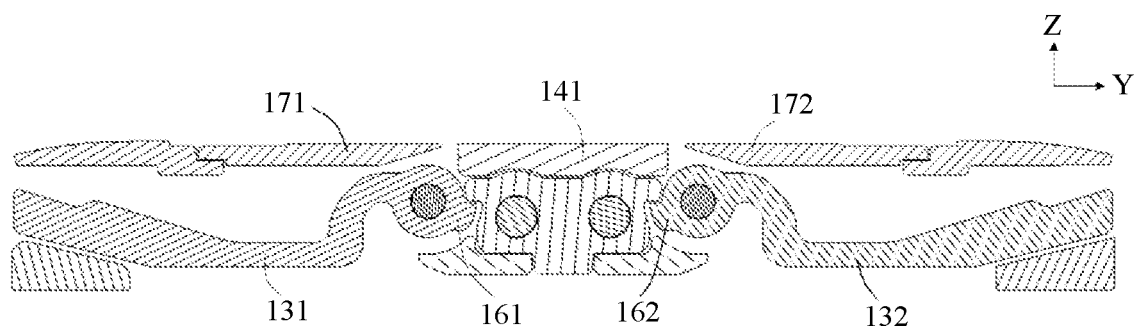
FIG. 34 is a partial view of FIG. 29, where a first connecting rod or a second connecting rod is a structure shown in FIG. 33.

To resolve the technical problem, as shown in FIG. 32 to FIG. 34, along the length direction X of the principal axis 14, the first gear 161 is located at at least one end of the first connecting rod 131, so that the first gear 161 is staggered with the first notch 141a along the length direction X of the principal axis 14, and the second gear 162 is located at at least one end of the second connecting rod 132, so that the second gear 162 is staggered with the second notch 141b along the length direction X of the principal axis 14. In addition, as shown in FIG. 8 and FIG. 22, the first support plate 171 is provided with a first extension segment 1714 extending along the width direction Y of the principal axis 14 toward the principal axis 14, and the second support plate 172 is provided with a second extension segment 1724 extending along the width direction Y of the principal axis 14 toward the principal axis 14. In addition, the first extension segment 1714 adapts to the first notch 141a of the principal inner axis 141, and the second extension segment 1724 adapts to the second notch 141b of the principal inner axis 141. In this way, the first extension segment 1714 can fill the first notch 141a, and the second extension segment 1724 can fill the second notch 141b. When the first support plate 171, the second support plate 172, and the principal inner axis 14 form a support surface used to support the flexible display 2, an opening of the support surface can be reduced, to improve support reliability of the folding apparatus 1.

As shown in FIG. 20, when the first gear 161 is disposed at two ends of the first connecting rod 131 in the length direction X of the principal axis 14, the first extension segment 1714 of the first support plate 171 is located between the two first gears 161. Similarly, when the second gear 162 is disposed at both ends of the second connecting rod 132 in the length direction X of the principal axis 14, the second extension segment 1724 of the second support plate 172 is located between the two second gears 162. When the first gear 161 is disposed at an end of the first connecting rod 131 along the length direction X of the principal axis 14, the first extension segment 1714 of the first support plate 171 and the first gear 161 are disposed along the length direction X of the principal axis 14. When the second gear 162 is disposed at an end of the second connecting rod 132 along the length direction X of the principal axis 14, the second extension segment 1724 of the second support plate 172 and the second gear 162 is disposed along the length direction X of the principal axis 14.

Figure 35:
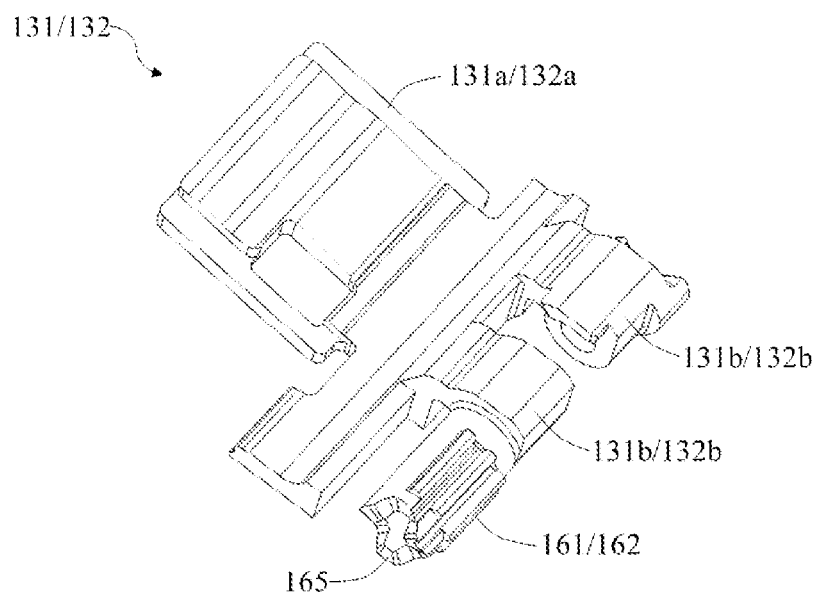
FIG. 35 is a schematic diagram of a structure of a first connecting rod or a second connecting rod in FIG. 20 in another specific embodiment.
Figure 36:
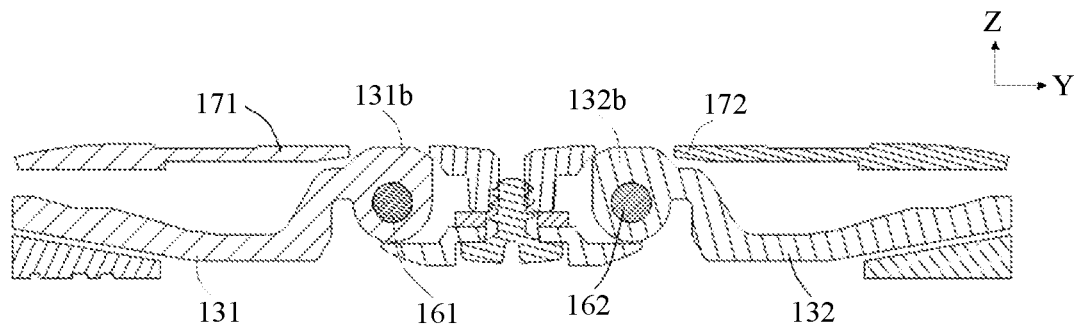
FIG. 36 is a partial view of FIG. 29, where a first connecting rod and a second connecting rod are a structure shown in FIG. 36.

In another specific embodiment, as shown in FIG. 35 and FIG. 36, a first platform 131b is disposed at an end that is of the first connecting rod 131 and that is close to the principal axis 14, and a second platform 132b is disposed at an end that is of the second connecting rod 132 and that is close to the principal axis 14. When the folding apparatus 1 is in the expanded state, at least a part of the first platform 131b is located in the first notch 141a of the principal inner axis 141, and at least a part of the second platform 132b is located in the second notch 141b of the principal inner axis 141. Therefore, the first platform 131b, the second platform 132b, the first support plate 171, and the second support plate 172 are flush.

In this embodiment, when the folding apparatus 1 is in the expanded state shown in FIG. 36, the first platform 131b is filled in the first notch 141a (namely, a gap between the first support plate 171 and the principal axis 14) of the principal inner axis 141, and the second platform 132b is filled in the second notch 141b (namely, a gap between the second support plate 172 and the principal axis 14) of the principal inner axis 141. In other words, the first support plate 171, the first platform 131b, the principal axis 14, the second platform 132b, and the second support plate 172 form a plane used to support the flexible display 2, and support reliability of the folding apparatus 1 for the flexible display 2 at a joint between the support plate assembly and the connecting rod assembly 13 can be improved by disposing the first platform 131b and the second platform 132b.

A function of the first platform 131b in this embodiment is similar to that of the first extension segment 1714 of the first support plate 171, and a function of the second platform 132b is similar to that of the second extension segment 1724 of the second support plate 172.

Certainly, specific structures of the first extension segment 1714, the second extension segment 1724, the first platform 131b, and the second platform 132b are not limited in this application, provided that the first notch 141a and the second notch 141b of the principal inner axis 141 can be filled.

In conclusion, the folding apparatus 1 in this application does not need to be provided with a through hole used to avoid the swing arm assembly 12 on the support plate assembly, to improve support reliability the folding apparatus 1 for the flexible display 2 at a joint between the swing arm assembly 12 and the support plate assembly. In addition, the folding apparatus 1 reduces a gap between the support plate assembly and the principal axis 14, to improve support reliability of the folding apparatus 1 for the flexible display 2 at a joint between the connecting rod assembly 13 and the support plate assembly, and reduce damage to the flexible display 2 caused by a hole in the folding apparatus 1 in a use process of the electronic device.

Figure 37:
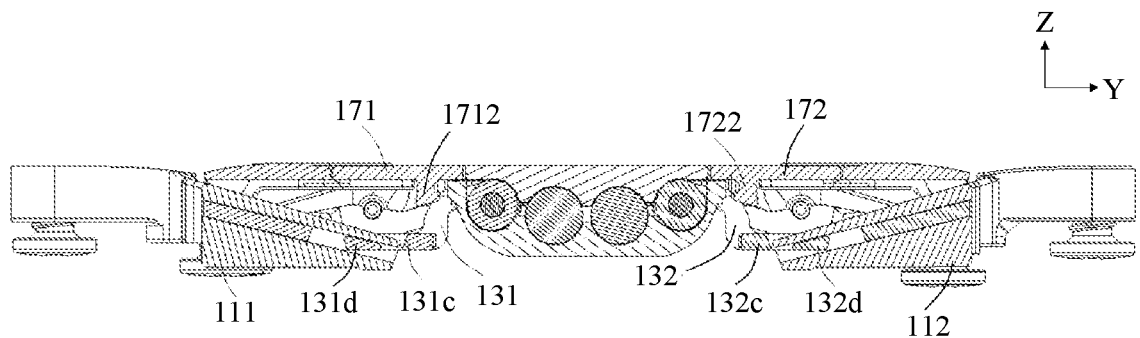
FIG. 37 is a sectional view of a folding apparatus in FIG. 7 at a first stopper and a second stopper.

In a specific embodiment, as shown in FIG. 32 and FIG. 37, a first stopper 131c is disposed on the first connecting rod 131, and a second stopper 132c is disposed on the second connecting rod 132. When the folding apparatus 1 is in the expanded state shown in FIG. 38, the first stopper 131c presses against the first bracket 111, to limit relative movement of the first connecting rod 131 and the first bracket 111 in the expanded state along the width direction Y of the principal axis 14. The second stopper 132c presses against the second bracket 112, to limit relative movement of the second connecting rod 132 and the second bracket 112 in the expanded state in the width direction Y of the principal axis 14. In this case, when the electronic device falls, the first bracket 111 and the second bracket 112 can be prevented from approaching each other along the width direction Y of the principal axis 14 by using the first stopper 131c and the first bracket 111 that press against each other, and the second stopper 132c and the second bracket 112 that press against each other, so that the folding apparatus 1 maintains in the expanded state shown in FIG. 37, and reliability of the folding apparatus 1 and the electronic device in the expanded state is improved. In this case, a force transfer chain of the folding apparatus 1 is: the bracket assembly, the connecting rod assembly 13 and the swing arm assembly 12, and the principal axis 14. The impact force transferred to the principal axis 14 can be reduced by using the bracket assembly and the connecting rod assembly 13 that press against each other.

Specifically, as shown in FIG. 32, the first stopper 131c protrudes from the first connecting rod 131 along the length direction X of the principal axis 14, the second stopper 132c protrudes from the second connecting rod 132 along the length direction X of the principal axis 14, and the first stopper 131c may be disposed at two ends of the first connecting rod 131 along the length direction X of the principal axis 14, and the second stopper 132c may be disposed at two ends of the second connecting rod 132. Referring to FIG. 20 and FIG. 37, when the folding apparatus 1 is in the expanded state, the first stopper 131c presses against an end face that is of the first bracket 111 and that is close to the principal axis 14, and the second stopper 132c presses against an end face that is of the second bracket 112 and that is close to the principal axis 14.

In this embodiment, a disposing position, a disposing quantity, and a specific shape of the first stopper 131c in the first connecting rod 131 are not limited, provided that the first stopper 131c can press against the first bracket 111 in the expanded state. In addition, a pressing position between the first bracket 111 and the first stopper 131c in the expanded state is not limited. For example, a stopper adapted to the first stopper 131c may be disposed on the first bracket 111, and the stopper does not contact the first stopper 131c of the first connecting rod 131 when the folding apparatus 1 is in the folded state, and presses against the first stopper 131c of the first connecting rod 131 when the folding apparatus 1 is in the expanded state. Similarly, the second stopper 132c of the second connecting rod 131 is not limited, and a position at which the second stopper 132c presses against the second bracket 112 is not limited.

As shown in FIG. 32, a third stopper 131d is further disposed on the first connecting rod 131, and a fourth stopper 132d is further disposed on the second connecting rod 132. When the folding apparatus 1 is in the folded state shown in FIG. 21, the third stopper 131d presses against the first support plate 171, to limit a case in which when the folding apparatus 1 is in the folded state, the first connecting rod 131 moves along the height direction Z of the principal axis 14. The fourth stopper 132d presses against the second support plate 172, to limit a case in which when the folding apparatus is in the folded state, the second connecting rod 132 moves along the height direction Z of the principal axis 14. In this case, when the electronic device falls down, the third stopper 131d and the first support plate 171 that press against each other, the fourth stopper 132d and the second support plate 172 that press against each other are used. In this way, when the first support plate 171 and the second support plate 172 are impacted by impact force along an arrow direction shown in FIG. 21, the principal axis 14 can be prevented from impacting by the impact force, to improve reliability of the folding apparatus 1 and the electronic device in the folded state. In this case, a force transfer chain of the folding apparatus 1 is: the bracket assembly, the support plate assembly, the connecting rod assembly 13 and the swing arm assembly 12, and the principal axis 14, and the impact force transferred to the principal axis 14 can be reduced by using the support plate assembly and the connecting rod assembly 13 that press against each other.

Figure 38:
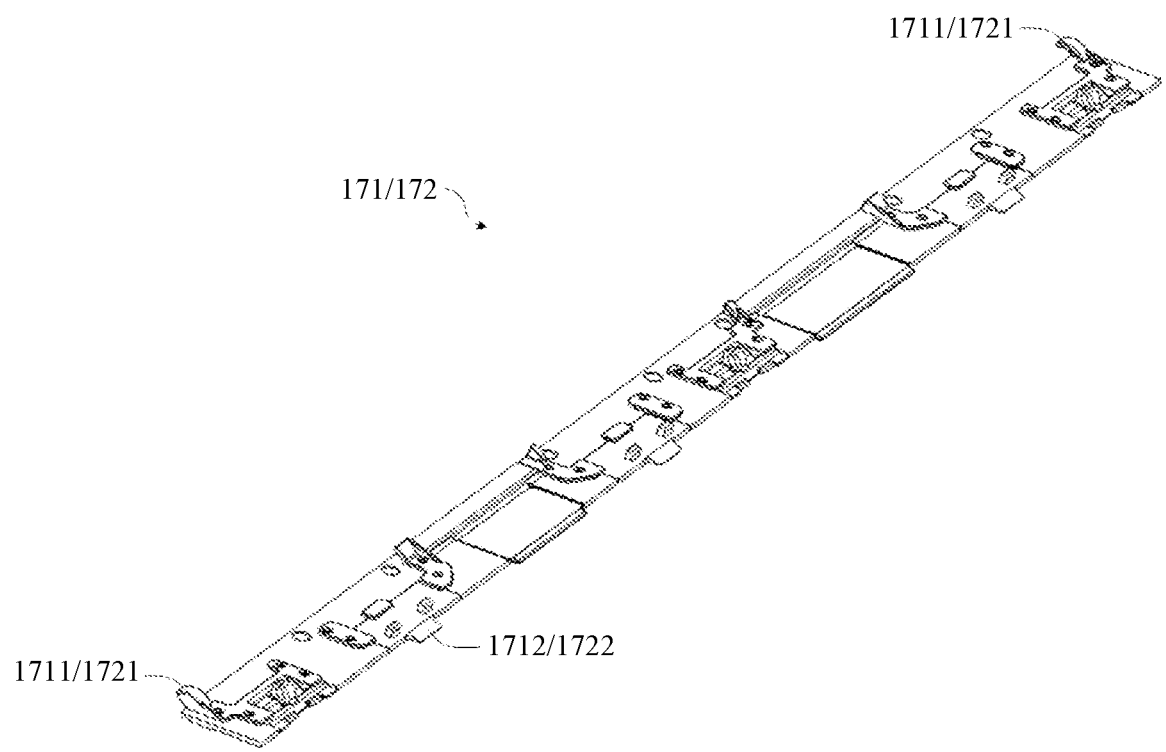
FIG. 38 is a schematic diagram of a structure of a first support plate or a second support plate in FIG. 37.
Figure 39:
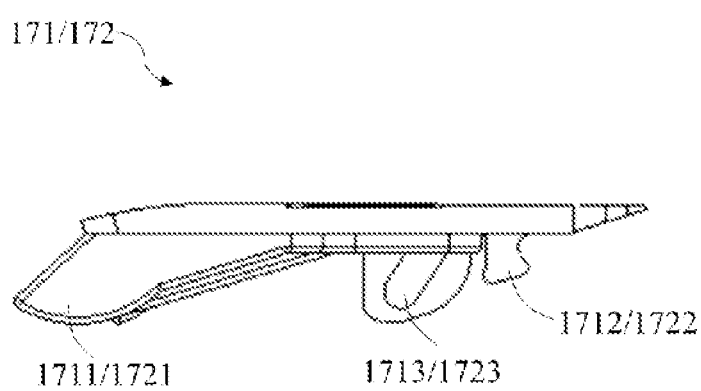
FIG. 39 is a side view of FIG. 38.

Specifically, as shown in FIG. 32, the third stopper 131d protrudes from the first connecting rod 131 along the length direction X of the principal axis 14, the fourth stopper 132d protrudes from the second connecting rod 132 along the length direction X of the principal axis 14, the third stopper 131d may be disposed at two ends of the first connecting rod 131 along the length direction X of the principal axis 14, and the fourth stopper 132d may be disposed at two ends of the second connecting rod 132. As shown in FIG. 38 and FIG. 39, a fifth stopper 1712 may be disposed on the first support plate 171, a sixth stopper 1722 may be disposed on the second support plate 172, and the fifth stopper 1712 and the sixth stopper 1722 extend downward along the height direction Z of the principal axis 14.

When the folding apparatus 1 is in the expanded state shown in FIG. 38, the fifth stopper 1712 of the first support plate 171 and the third stopper 131d of the first connecting rod 131 are separated from each other (the fifth stopper 1712 of the first support plate 171 and the third stopper 131d of the first connecting rod 131 are not in contact), and the sixth stopper 1722 of the second support plate 172 and the fourth stopper 132d of the second connecting rod 132 are separated from each other (the sixth stopper 1722 of the second support plate 172 and the fourth stopper 132d of the second connecting rod 132 are not in contact). When the folding apparatus 1 is in the folded state shown in FIG. 22, the fifth stopper 1712 of the first support plate 171 presses against the third stopper 131d of the first connecting rod 131, and the sixth stopper 1722 of the second support plate 172 presses against the fourth stopper 132d of the second connecting rod 132, so that the first support plate 171 presses against the first connecting rod 131, and the second support plate 172 presses against the second connecting rod 132.

In this embodiment, a disposing position, a disposing quantity, and a specific shape of the third stopper 131d in the first connecting rod 131 are not limited, provided that the third stopper 131d can press against the first support plate 171 in the folded state. In addition, a position at which the first support plate 171 presses against the first stopper 131c in the folded state is not limited. Similarly, the fourth stopper 132d of the second connecting rod 131 is not limited, and a position at which the fourth stopper 132d presses against the second support plate 172 is not limited.

In another specific embodiment, the first stopper 131c and the third stopper 131d may be further disposed on the first swing arm 121, and correspondingly, the second stopper 132c and the fourth stopper 132d may be further disposed on the second swing arm 122. Therefore, when the folding apparatus 1 is in the expanded state, the first swing arm 121 presses against the first bracket 111 by using the first stopper 131c, and the second swing arm 122 presses against the second bracket 112 by using the second stopper 132c. When the folding apparatus 1 is in the folded state, the first swing arm 121 presses against the first support plate 171 by using the third stopper 131d, and the second swing arm 122 presses against the second support plate 172 by using the fourth stopper 132d.

In addition, an embodiment of this application further provides an electronic device. As shown in FIG. 3, the electronic device includes any one of the folding apparatuses 1 in the foregoing implementations, and further includes a first housing 31, a second housing 32, and a flexible display 2 fastened or connected to the two housings. The first housing 31 and the second housing 32 are located on two sides of the folding apparatus 1, and the first housing 31 is fastened or connected to a first bracket 111 located on a same side.

As shown in FIG. 3, the flexible display 2 includes a first area 21, a second area 22, a third area 23, a fourth area 24, and a fifth area 25. The first area 21 is connected to the first housing 31 (which may be specifically adhesion), and the second area 22 is connected to the second housing 32 (which may be specifically adhesion). The third area 23, the fourth area 24, and the fifth area 25 correspond to the folding apparatus 1. To be specific, the accommodating space 174 of the folding apparatus 1 is used to accommodate the third area 23, the fourth area 24, and the fifth area 25. In other words, the third area 23, the fourth area 24, and the fifth area 25 form the folded part 26 of the flexible display 2. Specifically, the third area 23 corresponds to the first support plate 171, the fourth area 24 corresponds to the second support plate 172, and the fifth area 25 corresponds to the principal axis 14.

The following describes a specific connection manner between the support plate 17 and the flexible display 2.

In a specific embodiment, as shown in FIG. 4, the third area 23 is not fastened or connected to the first support plate 171, the fourth area 24 is not fastened or connected to the second support plate 172, and the fifth area 25 is not fastened or connected to the principal axis 14. In this embodiment, when the electronic device is in a folded state, the third area 23, the fourth area 24, and the fifth area 25 are folded to form a water drop structure. In other words, the folded part 26 is a water drop shape, and the fifth area 25 is in a semi-arc shape after being folded.

In another specific embodiment, as shown in FIG. 5, the third area 23 is fastened or connected to the first support plate 171 (which may be specifically adhesion), the fourth area 24 is fastened or connected to the second support plate 172 (which may be specifically adhesion), and the fifth area 25 is not fastened or connected to the principal axis 14. In this case, when the electronic device is in the folded state, the fifth area 25 encloses a semi-arc.

In this embodiment, when the third area 23 is fastened or connected to the first support plate 171, and the fourth area 24 is fastened or connected to the second support plate 172, in a folding or expanding process of the electronic device, the third area 23 can move with the first support plate 171, and the fourth area 24 can move with the second support plate 172. In other words, the third area 23 does not move relative to the first support plate 171. This improves flatness of the folded part 26 of the flexible display 2 in the folding and folding processes, and reduces a risk of a flexible display 2 failure.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A folding apparatus, comprising: a principal axis; a bracket assembly, comprising a first bracket and a second bracket that are arranged on two sides of the principal axis along a width direction of the principal axis; a connecting rod assembly, comprising a first connecting rod and a second connecting rod arranged on two sides of the principal axis along the width direction of the principal axis, the first connecting rod and the second connecting rod being rotatable relative to the principal axis, the first connecting rod including a first outer end part positioned away from the principal axis, the second connecting rod including a second outer end part positioned away from the principal axis, the first bracket being slidable relative to the first connecting rod, and the second bracket being slidable relative to the second connecting rod; a swing arm assembly, comprising a first swing arm and a second swing arm arranged on two sides of the principal axis along the width direction of the principal axis, the first swing arm and the second swing arm being rotatable relative to the principal axis, the first bracket and the first swing arm being connected through a first rotating shaft, the second bracket and the second swing arm being connected through a second rotating shaft; and a support plate assembly, comprising a first support plate and a second support plate arranged on two sides of the principal axis along the width direction of the principal axis, the first support plate being rotatably connected to the first bracket, the first support plate being slidably connected to the first swing arm or to the first connecting rod and being rotatable relative to each other, the second support plate being rotatably connected to the second bracket, and the second support plate being slidably connected to the second swing arm or the second connecting rod and rotatable relative to each other, wherein: rotation axis centers of the first connecting rod and the first swing arm on the principal axis are parallel to each other and do not overlap, and rotation axis centers of the second connecting rod and the second swing arm on the principal axis are parallel to each other and do not overlap; the folding apparatus is deployable between a folded state and an expanded state, and when the folding apparatus is in the expanded state, the first outer end part is in a first position, the second outer end part is in a second position, an axis of the first rotating shaft is located on a side of the first outer end part in the first position positioned away from the principal axis, and an axis of the second rotating shaft is located on a side of the second outer end part in the second position positioned away from the principal axis; and when the first bracket and the second bracket rotate relative to each other, the first bracket drives the first connecting rod and the first swing arm to rotate around the principal axis, and drives an end of the first support plate in close proximity to the principal axis to move along a direction away from the principal axis, and the second bracket drives the second connecting rod and the second swing arm to rotate around the principal axis, and drives an end of the second support plate in close proximity to the principal axis to move along a direction away from the principal axis, so that a preset included angle is formed when the first support plate and the second support plate are in the folded state, and the first support plate, the second support plate, and the principal axis jointly enclose screen accommodating space.

2. The folding apparatus according to claim 1, wherein:
one of the first connecting rod and the first bracket is provided with a first sliding block, the other of the first connecting rod and the first bracket is provided with a first track, the first sliding block being slidable along the first track;
one of the second connecting rod and the second bracket is provided with a second sliding block, the other of the second connecting rod and second bracket is provided with a second track, and the second sliding block being slidable along the second track; and
the first track includes a third outer end part positioned away from the principal axis, the second track including a fourth outer end part away from the principal axis, the axis of the first rotating shaft being located on a side of the third outer end part positioned away from the principal axis, and the axis of the second rotating shaft is located on a side of the fourth outer end part positioned away from the principal axis.

3. The folding apparatus according to claim 1, wherein the first bracket includes a fifth outer end part positioned away from the principal axis, and the second bracket includes a sixth outer end part positioned away from the principal axis; and the first rotating shaft is disposed on the fifth outer end part, and a second rotating shaft is disposed on the sixth outer end part.

4. The folding apparatus according to claim 1, wherein the first swing arm includes a seventh outer end part positioned away from the principal axis, and the second swing arm includes an eighth outer end part positioned away from the principal axis; and
the first rotating shaft is disposed on the seventh outer end part, and the second rotating shaft is disposed on the eighth outer end part.

5. The folding apparatus according to claim 1, wherein the first bracket includes a fifth outer end part positioned away from the principal axis, the second bracket includes a sixth outer end part positioned away from the principal axis, the first swing arm includes a seventh outer end part positioned away from the principal axis, and the second swing arm includes an eighth outer end part positioned away from the principal axis; and
the fifth outer end part and the seventh outer end part are rotatably connected through the first rotating shaft, and the sixth outer end part and the eighth outer end part are rotatably connected through the second rotating shaft.

6. The folding apparatus according to claim 1, wherein the folding apparatus further comprises a tension assembly, and when the folding apparatus is in the expanded state, the tension assembly drives the first bracket and the second bracket to move toward a back-to-back orientation.

7. The folding apparatus according to claim 6, wherein the tension assembly comprises two tension groups, one tension group is disposed between the first connecting rod and the first bracket, the other of the two tension groups is disposed between the second connecting rod and the second bracket, and each tension group comprises a pushing piece and a driving piece; and
when the folding apparatus is in the expanded state, under an action of the driving piece in each tension group, the pushing piece in each tension group separately pushes the first bracket and the second bracket to move toward a back-to-back orientation.

8. The folding apparatus according to claim 7, wherein each tension group further comprises a guiding piece, the guiding piece in each tension group is provided with a guiding hole, the pushing piece in each tension group comprises a sliding part, and the sliding part in each tension group slidably cooperates with the guiding hole to limit travel of the pushing piece in the tension group.

9. The folding apparatus according to claim 7, wherein the driving piece in each tension group is an elastic piece, one end of the elastic piece in each tension group is connected to the pushing piece in the tension group, and the other end of the elastic piece in each tension group is connected to the first connecting rod or to the second connecting rod.

10. The folding apparatus according to claim 1, wherein the folding apparatus further comprises a synchronization gear group, the synchronization gear group comprises a first gear, a second gear, a third gear, and a fourth gear that are arranged along the width direction of the principal axis, the first gear is engaged with the third gear, the second gear is engaged with the fourth gear, and the third gear is engaged with the fourth gear;
the principal axis comprises a principal inner axis and a principal outer axis that are connected, and along a height direction of the principal axis, the synchronization gear group is located between the principal inner axis and the principal outer axis;
the first support plate includes a first extension segment extending along the width direction of the principal axis toward the principal axis, the second support plate includes a second extension segment extending along the width direction of the principal axis toward the principal axis, and two ends of the principal inner axis along the width direction of the principal axis respectively include a first notch adapting to the first extension segment and a second notch adapting to the second extension segment; and
along a length direction of the principal axis, the first gear is disposed at at least one end of the first connecting rod, the first gear is staggered with the first extension segment, the second gear is disposed at at least one end of the second connecting rod, and the second gear is staggered with the second extension segment.

11. The folding apparatus according to claim 1, wherein the folding apparatus further comprises a synchronization gear group, the synchronization gear group comprises a first gear, a second gear, a third gear, and a fourth gear that are arranged along the width direction of the principal axis, the first gear is engaged with the third gear, the second gear is engaged with the fourth gear, and the third gear is engaged with the fourth gear;
the principal axis comprises a principal inner axis and a principal outer axis that are connected, along a height direction of the principal axis, the synchronization gear group is located between the principal inner axis and the principal outer axis, and two ends of the principal inner axis along the width direction of the principal axis respectively have a first notch and a second notch; and
a first platform is disposed at an end that is of the first connecting rod and that is close to the principal axis, a second platform is disposed at an end of the second connecting rod that is close to the principal axis, and when the folding apparatus is in an expanded state, at least a part of the first platform is located in the first notch, and at least a part of the second platform is located in the second notch, so that the first platform, the second platform, the first support plate, and the second support plate form a support surface used to support a flexible display.

12. The folding apparatus according to claim 1, wherein a first stopper and a third stopper are disposed on the first connecting rod, and a second stopper and a fourth stopper are disposed on the second connecting rod;
when the folding apparatus is in the expanded state, the first stopper presses against the first bracket to limit the first bracket and the first connecting rod to move relative to each other along the width direction of the principal axis, and the second stopper presses against the second bracket to limit the second bracket and the second connecting rod to move relative to each other along the width direction of the principal axis; and
when the folding apparatus is in the folded state, the third stopper presses against the first support plate to limit the first connecting rod and the first support plate to move relative to each other along the height direction of the principal axis, and the fourth stopper presses against the second support plate to limit the second connecting rod and the second support plate to move relative to each other along the height direction of the principal axis.

13. The folding apparatus according to claim 12, wherein the first stopper and the third stopper protrude from the first connecting rod along the length direction of the principal axis, and the second stopper and the fourth stopper protrude from the second connecting rod along the length direction of the principal axis;
- a fifth stopper extending along the height direction of the principal axis is disposed on the first support plate, and a sixth stopper extending along the height direction of the principal axis is disposed on the second support plate;
- when the folding apparatus is in the expanded state, the first stopper presses against an end face that is of the first bracket and that is close to the principal axis, and the second stopper presses against an end face that is of the second bracket and that is close to the principal axis; and
- when the folding apparatus is in the folded state, the third stopper presses against the fifth stopper, and the fourth stopper presses against the sixth stopper.

14. The folding apparatus according to claim 1, wherein a third track is disposed on the first support plate, and a fourth track is disposed on the second support plate;
- a first hinge pin that can slide along the third track is disposed on the first connecting rod or the first swing arm, and a second hinge pin that can slide along the fourth track is disposed on the second connecting rod or the second swing arm;
- the third track includes a first end and a second end that are oppositely disposed, the fourth track includes a third end and a fourth end that are oppositely disposed, the second end is located between the first end and the principal axis, and the fourth end is located between the third end and the principal axis; and
- when the folding apparatus is in the expanded state, the first hinge pin is located at the first end, and the second hinge pin is located at the third end; and when the folding apparatus is in the folded state, the first hinge pin is located at the second end, and the second hinge pin is located at the fourth end.

15. An electronic device, wherein the electronic device comprises a first housing, a second housing, a flexible display, and a folding apparatus, wherein the first housing and the second housing are located on two sides of the folding apparatus, the first housing is connected to a first bracket located on a same side, and the second housing is connected to a second bracket located on a same side; and the flexible display covers the first housing, the second housing, and the folding apparatus, and is connected to the first housing and the second housing; and wherein the folding apparatus comprises: a principal axis; a bracket assembly, comprising the first bracket and the second bracket that are arranged on two sides of the principal axis along a width direction of the principal axis; a connecting rod assembly, comprising a first connecting rod and a second connecting rod arranged on two sides of the principal axis along the width direction of the principal axis, the first connecting rod and the second connecting rod being rotatable relative to the principal axis, the first connecting rod including a first outer end part positioned away from the principal axis, the second connecting rod including a second outer end part positioned away from the principal axis, the first bracket being slidable relative to the first connecting rod, and the second bracket being slidable relative to the second connecting rod; a swing arm assembly comprising a first swing arm and a second swing arm arranged on two sides of the principal axis along the width direction of the principal axis, the first swing arm and the second swing arm being rotatable relative to the principal axis, the first bracket and the first swing arm being connected through a first rotating shaft, the second bracket and the second swing arm being connected through a second rotating shaft; and a support plate assembly, comprising a first support plate and a second support plate arranged on two sides of the principal axis along the width direction of the principal axis, the first support plate being rotatably connected to the first bracket, the first support plate being slidably connected to the first swing arm or to the first connecting rod and being rotatable relative to each other, the second support plate being rotatably connected to the second bracket, and the second support plate being slidably connected to the second swing arm or the second connecting rod and rotatable relative to each other, wherein: rotation axis centers of the first connecting rod and the first swing arm on the principal axis are parallel to each other and do not overlap, and rotation axis centers of the second connecting rod and the second swing arm on the principal axis are parallel to each other and do not overlap; the folding apparatus is deployable between a folded state and an expanded state, and when the folding apparatus is in the expanded state, the first outer end part is in a first position, the second outer end part is in a second position, an axis of the first rotating shaft is located on a side of the first outer end part in the first position positioned away from the principal axis, and an axis of the second rotating shaft is located on a side of the second outer end part in the second position positioned away from the principal axis; and when the first bracket and the second bracket rotate relative to each other, the first bracket drives the first connecting rod and the first swing arm to rotate around the principal axis, and drives an end of the first support plate in close proximity to the principal axis to move along a direction away from the principal axis, and the second bracket drives the second connecting rod and the second swing arm to rotate around the principal axis, and drives an end of the second support plate in close proximity to the principal axis to move along a direction away from the principal axis, so that a preset included angle is formed when the first support plate and the second support plate are in the folded state, and the first support plate, the second support plate, and the principal axis jointly enclose screen accommodating space.

16. The electronic device according to claim 15, wherein the flexible display is fastened or connected to at least a part of the support plate assembly.

17. The electronic device according to claim 15, wherein one of the first connecting rod and the first bracket is provided with a first sliding block, the other of the first connecting rod and the first bracket is provided with a first track, the first sliding block being slidable along the first track;
- one of the second connecting rod and the second bracket is provided with a second sliding block, the other of the second connecting rod and second bracket is provided with a second track, and the second sliding block being slidable along the second track; and
- the first track includes a third outer end part positioned away from the principal axis, the second track including a fourth outer end part away from the principal axis, the axis of the first rotating shaft being located on a side of the third outer end part positioned away from the principal axis, and the axis of the second rotating shaft is located on a side of the fourth outer end part positioned away from the principal axis.

18. The electronic device according to claim 15, wherein the first bracket includes a fifth outer end part positioned away from the principal axis, and the second bracket includes a sixth outer end part positioned away from the principal axis; and the first rotating shaft is disposed on the fifth outer end part, and a second rotating shaft is disposed on the sixth outer end part.

19. The electronic device according to claim 15, wherein the first swing arm includes a seventh outer end part positioned away from the principal axis, and the second swing arm includes an eighth outer end part positioned away from the principal axis; and the first rotating shaft is disposed on the seventh outer end part, and the second rotating shaft is disposed on the eighth outer end part.

20. The electronic device according to claim 15, wherein the first bracket includes a fifth outer end part positioned away from the principal axis, the second bracket includes a sixth outer end part positioned away from the principal axis, the first swing arm includes a seventh outer end part positioned away from the principal axis, and the second swing arm includes an eighth outer end part positioned away from the principal axis; and the fifth outer end part and the seventh outer end part are rotatably connected through the first rotating shaft, and the sixth outer end part and the eighth outer end part are rotatably connected through the second rotating shaft.

21. The electronic device according to claim 15, wherein the folding apparatus further comprises a tension assembly, and when the folding apparatus is in the expanded state, the tension assembly drives the first bracket and the second bracket to move toward a back-to-back orientation.

22. The electronic device according to claim 21, wherein the tension assembly comprises two tension groups, one tension group is disposed between the first connecting rod and the first bracket, the other of the two tension groups is disposed between the second connecting rod and the second bracket, and each tension group comprises a pushing piece and a driving piece; and when the folding apparatus is in the expanded state, under an action of the driving piece in each tension group, the pushing piece in each tension group separately pushes the first bracket and the second bracket to move toward a back-to-back orientation.

23. The electronic device according to claim 22, wherein each tension group further comprises a guiding piece, the guiding piece in each tension group is provided with a guiding hole, the pushing piece in each tension group comprises a sliding part, and the sliding part in each tension group slidably cooperates with the guiding hole to limit a travel of the pushing piece in the tension group.

24. The electronic device according to claim 22, wherein the driving piece in each tension group is an elastic piece, one end of the elastic piece in each tension group is connected to the pushing piece in the tension group, and the other end of the elastic piece in each tension group is connected to the first connecting rod or to the second connecting rod.

25. The electronic device according to claim 15, wherein the folding apparatus further comprises a synchronization gear group, the synchronization gear group comprises a first gear, a second gear, a third gear, and a fourth gear that are arranged along the width direction of the principal axis, the first gear is engaged with the third gear, the second gear is engaged with the fourth gear, and the third gear is engaged with the fourth gear;

the principal axis comprises a principal inner axis and a principal outer axis that are connected, and along a height direction of the principal axis, the synchronization gear group is located between the principal inner axis and the principal outer axis;

the first support plate includes a first extension segment extending along the width direction of the principal axis toward the principal axis, the second support plate includes a second extension segment extending along the width direction of the principal axis toward the principal axis, and two ends of the principal inner axis along the width direction of the principal axis respectively include a first notch adapting to the first extension segment and a second notch adapting to the second extension segment; and along a length direction of the principal axis, the first gear is disposed at at least one end of the first connecting rod, the first gear is staggered with the first extension segment, the second gear is disposed at at least one end of the second connecting rod, and the second gear is staggered with the second extension segment.

26. The electronic device according to claim 15, wherein the folding apparatus further comprises a synchronization gear group, the synchronization gear group comprises a first gear, a second gear, a third gear, and a fourth gear that are arranged along the width direction of the principal axis, the first gear is engaged with the third gear, the second gear is engaged with the fourth gear, and the third gear is engaged with the fourth gear;

the principal axis comprises a principal inner axis and a principal outer axis that are connected, along a height direction of the principal axis, the synchronization gear group is located between the principal inner axis and the principal outer axis, and two ends of the principal inner axis along the width direction of the principal axis respectively have a first notch and a second notch; and a first platform is disposed at an end of the first connecting rod that is close to the principal axis, a second platform is disposed at an end of the second connecting rod that is close to the principal axis, and when the folding apparatus is in an expanded state, at least a part of the first platform is located in the first notch, and at least a part of the second platform is located in the second notch, so that the first platform, the second platform, the first support plate, and the second support plate form a support surface used to support a flexible display.

27. The electronic device according to claim 15, wherein a first stopper and a third stopper are disposed on the first connecting rod, and a second stopper and a fourth stopper are disposed on the second connecting rod;

when the folding apparatus is in the expanded state, the first stopper presses against the first bracket to limit the first bracket and the first connecting rod to move relative to each other along the width direction of the principal axis, and the second stopper presses against the second bracket to limit the second bracket and the second connecting rod to move relative to each other along the width direction of the principal axis; and when the folding apparatus is in the folded state, the third stopper presses against the first support plate to limit the first connecting rod and the first support plate to move relative to each other along the height direction of the principal axis, and the fourth stopper presses against the second support plate to limit the second connecting rod and the second support plate to move relative to each other along the height direction of the principal axis.

28. The electronic device according to claim 27, wherein the first stopper and the third stopper protrude from the first connecting rod along the length direction of the principal axis, and the second stopper and the fourth stopper protrude from the second connecting rod along the length direction of the principal axis;
- a fifth stopper extending along the height direction of the principal axis is disposed on the first support plate, and a sixth stopper extending along the height direction of the principal axis is disposed on the second support plate;
- when the folding apparatus is in the expanded state, the first stopper presses against an end face that is of the first bracket and that is close to the principal axis, and the second stopper presses against an end face that is of the second bracket and that is close to the principal axis; and
- when the folding apparatus is in the folded state, the third stopper presses against the fifth stopper, and the fourth stopper presses against the sixth stopper.

29. The electronic device according to claim 15, wherein a third track is disposed on the first support plate, and a fourth track is disposed on the second support plate;
- a first hinge pin that can slide along the third track is disposed on the first connecting rod or the first swing arm, and a second hinge pin that can slide along the fourth track is disposed on the second connecting rod or the second swing arm;
- the third track includes a first end and a second end that are oppositely disposed, the fourth track includes a third end and a fourth end that are oppositely disposed, the second end is located between the first end and the principal axis, and the fourth end is located between the third end and the principal axis; and
- when the folding apparatus is in the expanded state, the first hinge pin is located at the first end, and the second hinge pin is located at the third end; and when the folding apparatus is in the folded state, the first hinge pin is located at the second end, and the second hinge pin is located at the fourth end.

* * * * *